(12) United States Patent
Takano

(10) Patent No.: US 10,764,923 B2
(45) Date of Patent: Sep. 1, 2020

(54) APPARATUS AND METHOD FOR LISTEN-BEFORE-TALK IN A FREQUENCY BAND

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/751,977

(22) PCT Filed: Jul. 8, 2016

(86) PCT No.: PCT/JP2016/070324
§ 371 (c)(1),
(2) Date: Feb. 12, 2018

(87) PCT Pub. No.: WO2017/061157
PCT Pub. Date: Apr. 13, 2017

(65) Prior Publication Data
US 2018/0242359 A1 Aug. 23, 2018

(30) Foreign Application Priority Data
Oct. 6, 2015 (JP) .................................. 2015-198325

(51) Int. Cl.
*H04W 74/08* (2009.01)
*H04W 72/04* (2009.01)

(52) U.S. Cl.
CPC ... *H04W 74/0808* (2013.01); *H04W 72/0453* (2013.01)

(58) Field of Classification Search
CPC ......... H04W 74/0808; H04W 72/0453; H04W 74/08; H04W 72/08
See application file for complete search history.

(56) References Cited

U.S. PATENT DOCUMENTS

2018/0054741 A1* 2/2018 Froberg Olsson .... H04W 16/14
2018/0199376 A1* 7/2018 Kim ......................... H04L 1/18

FOREIGN PATENT DOCUMENTS

WO    2013/183331 A1    12/2013

OTHER PUBLICATIONS

International Search Report dated Sep. 27, 2016, in PCT/JP2016/070324 filed Jul. 8, 2016.
ZTE, "Design of DL LBT", 3GPP TSG-RAN WGl#82 R1-154750, Internet <URL:http://www.3gpp.org/ftp/tsg_ran/Wg1_rl1/TSGR1_82/Docs/R1-154750.zip>, Aug. 19, 2015, pp. 1-7.

* cited by examiner

*Primary Examiner* — Moo Jeong
(74) *Attorney, Agent, or Firm* — Xsensus LLP

(57) ABSTRACT

[Object] To provide a mechanism in which Listen-Before-Talk (LBT) can be efficiently executed using a millimeter-wave band.
[Solution] An apparatus including: a processing unit configured to infer, on a basis of a result of LBT related to at least one first unit frequency band included in a group that includes a plurality of unit frequency bands, a result of LBT related to a second unit frequency band other than the first unit frequency band included in the group.

20 Claims, 18 Drawing Sheets

## APPARATUS AND METHOD FOR LISTEN-BEFORE-TALK IN A FREQUENCY BAND

TECHNICAL FIELD

The present disclosure relates to an apparatus and a method.

BACKGROUND ART

Wireless communication environment in recent years faces a problem of a rapid increase in data traffic. Hence, in 3GPP, installing a large number of small cells in a macro cell to increase network density, thereby distributing traffic, has been under study. Such a technology utilizing small cells is referred to as small cell enhancement. Note that small cells may conceptually include various types of cells (e.g., a femto cell, a nano cell, a pica cell, a micro cell, and the like) that are smaller than a macro cell and are arranged to overlap a macro cell.

In addition, as one way to expand radio resources, utilization of a frequency band of 6 GHz or more, which is called a millimeter-wave band, has been under study. However, since the millimeter-wave band has strong straightness and exhibits large radio propagation attenuation, utilization in a small cell smaller than a macro cell is expected. Furthermore, since the range of the millimeter-wave band is very large, all frequency bands are not assumed to be licensed bands and a considerable number of frequency bands are assumed to be unlicensed bands for which secondary use is possible.

As a technology related to secondary use of frequencies, for example, Patent Literature 1 mentioned below discloses a mechanism in which information is exchanged between a plurality of networks operated by different service providers and thereby a service provider can ascertain whether a frequency band of another service provider can be utilized.

CITATION LIST

Patent Literature

Patent Literature 1: WO 2013/183331

DISCLOSURE OF INVENTION

Technical Problem

A device that uses an unlicensed band is assumed to perform Listen-Before Talk (LBT) to check whether there is a vacant frequency band before transmission. However, since the millimeter-wave band is extensive, it is desirable to provide a mechanism in which LBT can be efficiently executed.

Solution to Problem

According to the present disclosure, there is provided an apparatus including: a processing unit configured to infer, on a basis of a result of LBT related to at least one first unit frequency band included in a group that includes a plurality of unit frequency bands, a result of LBT related to a second unit frequency band other than the first unit frequency band included in the group.

In addition, according to the present disclosure, there is provided a method including: inferring, by a processor, on a basis of a result of LBT related to at least one first unit frequency band included in a group that includes a plurality of unit frequency bands, a result of LBT related to a second unit frequency band other than the first unit frequency band included in the group.

Advantageous Effects of Invention

According to the present disclosure described above, a mechanism in which LBT can be efficiently executed is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
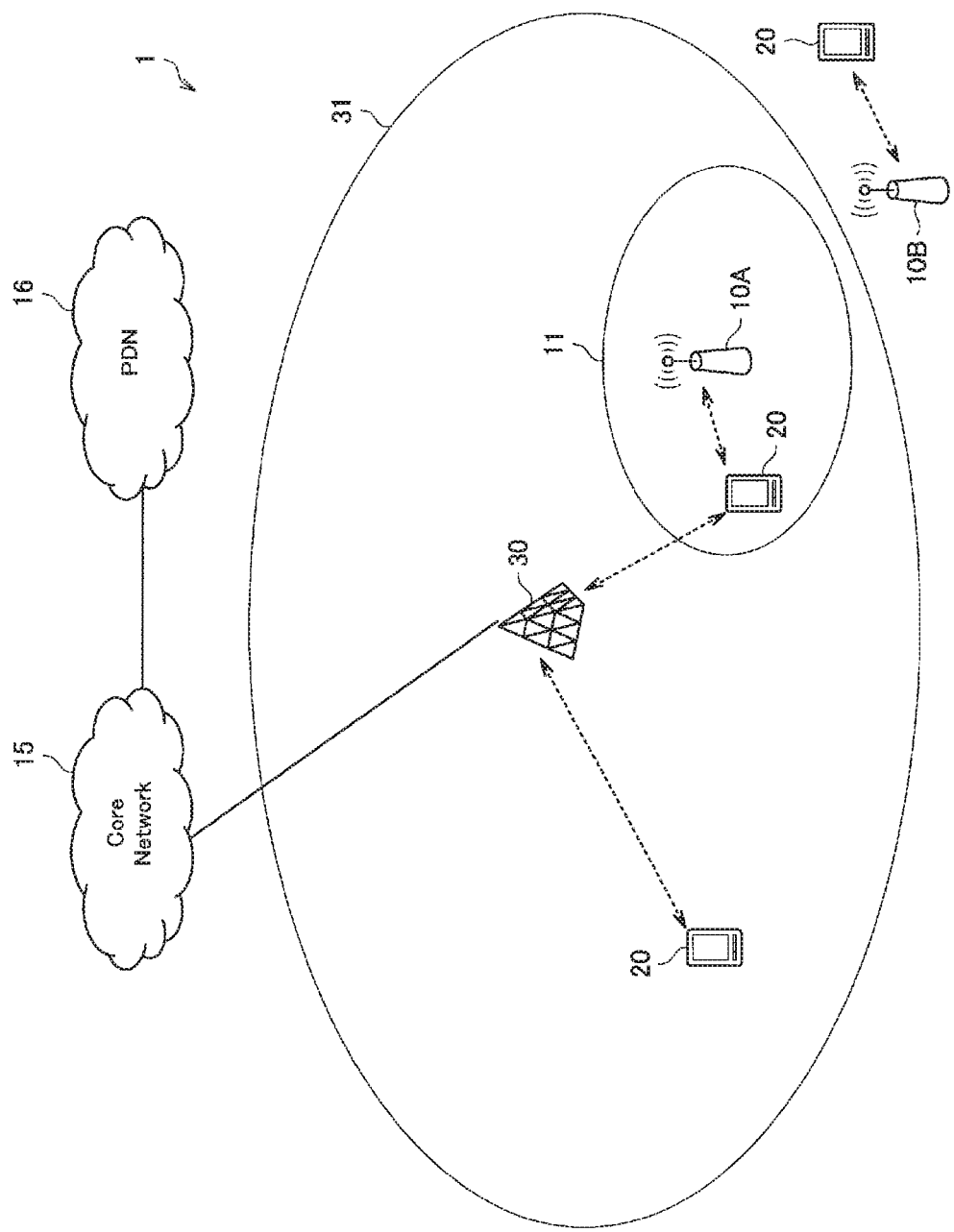
FIG. 1 is an explanatory diagram for describing an overview of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and the drawings, there are cases in which elements with substantially the same functional configurations are distinguished from each other by attaching different letters to the end of the same reference numerals. For example, a plurality of elements having substantially the same functional configuration are distinguished from each other, like base stations 10A, 10B, and 10C, if necessary. However, in a case in which it is not particularly necessary to distinguish a plurality of elements having substantially the same functional configuration from each other, only the same reference numeral is given. For example, in a case in which it is particularly not necessary to distinguish base stations 10A, 10B, and 10C, they are simply referred to as "base stations 10."

Note that description will be given in the following order.
1. Introduction
1.1. Small cell
1.2. Carrier aggregation
1.3. Examination regarding millimeter-wave band
1.4. LBT
1.5. Examination regarding unlicensed band
1.6. Summary of points to be noted when millimeter-wave band is introduced
2. Configuration examples
2.1. Configuration example of base station
2.2. Configuration example of terminal apparatus
3. First embodiment
3.1. Technical problems
3.2. Technical features
3.3. Flow of process
4. Second embodiment
4.1. Technical problems
4.2. Technical features
5. Third embodiment
5.1. Technical problems
5.2. Technical features
5.3. Flow of process
6. Application examples
7. Conclusion

1. Introduction

<1.1. Small Cell>

FIG. 1 is an explanatory diagram for describing an overview of a system 1 according to an embodiment of the present disclosure. As illustrated in FIG. 1, the system 1 includes a base station 10, a terminal apparatus 20, and a communication control apparatus 30.

In the example of FIG. 1, the communication control apparatus 30 is a macro cell base station. The macro cell base station 30 provides a wireless communication service for one or more terminal apparatuses 20 located inside a macro cell 31. The macro cell base station 30 is connected to a core network 15. The core network 15 is connected to a packet data network (PDN) 16 via a gateway apparatus (not illustrated). The macro cell 31 may be operated in accordance with any wireless communication scheme, such as long term evolution (LTE), LTE-advanced (LTE-A), GSM (registered trademark), UMTS, W-CDMA, CDMA200, WiMAX, WiMAX2, or IEEE802.16, for example. Note that without being limited to the example of FIG. 1, a control node in the core network 15 or the PDN 16 (a host node of the macro cell base station) may have a function of controlling wireless communication in a macro cell and a small cell in a cooperative manner. Note that the macro cell base station may also be referred to as a Macro eNodeB.

The base station 10A is a small cell base station that operates a small cell 11. Typically, the small cell base station 10A is authorized to allocate radio resources to the terminal apparatus 20 that connects to the own apparatus. However, allocation of radio resources may be at least partially entrusted to the communication control apparatus 30 for cooperative control. A base station 10A may be a small cell base station fixedly installed as illustrated in FIG. 1, or may be a dynamic access point (AP) that dynamically operates the small cell 11. Note that the small cell base station may also be referred to as a pico eNB or a Femto eNB. A base station 10B is an AP that operates a Wi-Fi network. The AP 10B performs wireless communication with the terminal apparatus 20 connected thereto. There may be a case in which the small cell base station 10A or the macro cell base station 30 and the AP 10B use an overlapping frequency due to utilization of an unlicensed band which will be described below.

The terminal apparatus 20 connects to the macro cell base station 30, the small cell base station 10 or the AP 10B to enjoy a wireless communication service. For example, the terminal apparatus 20 that connects to the small cell base station 10 receives a control signal from the macro cell base station 30, and receives a data signal from the small cell base station 10. The terminal apparatus 20 is also called a user. The user may also be called user equipment (UE). Here. UE may be LTE defined in LTE or LTE-A, or more generally may mean communication equipment.

<1.2. Carrier Aggregation>

A technology related to carrier aggregation prescribed in LTE Release 10 (i.e., 3GPP Release 10) is described below.

(1) Component Carrier

Carrier aggregation is a technology of improving throughput of communication by forming a communication channel between a base station and a terminal apparatus by aggregating a plurality of unit frequency bands supported in LTE, for example. Individual unit frequency bands included in one communication channel formed by carrier aggregation are referred to as component carriers (CCs). Here, a CC may be a CC defined in LIE or LTE-A, or more generally may mean a unit frequency band.

In LTE Release 10, it is possible to aggregate five CCs at maximum. In addition, one CC has a width of 20 MHz. Note that the CCs to be aggregated may be arranged consecutively on a frequency axis, or may be arranged apart from each other. Moreover, which CC to aggregate and use can be set for each terminal apparatus.

The plurality of CCs that are aggregated are classified into one primary component carrier (PCC) and a secondary component carrier (SCC) other than the PCC. The PCC is different for each terminal apparatus. Since the PCC is the most important CC, it is desirable that the CC with the most stable communication quality be selected.

Figure 2:
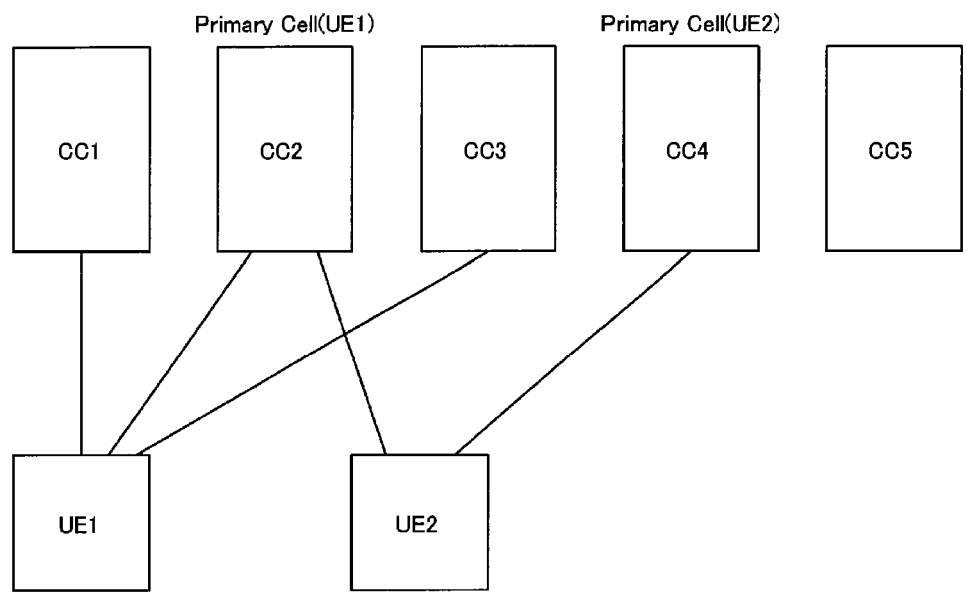
FIG. 2 is an explanatory diagram for describing component carriers.

FIG. 2 is an explanatory diagram for describing component carriers. In the example illustrated in FIG. 2, a situation in which two, pieces of UE use some of five CCs in aggregation is illustrated. In detail, UE1 uses CC1, CC2, and CC3 in aggregation, and UE2 uses CC2 and CC4 in aggregation. Moreover, the PCC of UE1 is CC2. The PCC of UE2 is CC4.

Here, selection of a PCC is dependent on implementation. An SCC is changed by deleting the SCC and adding another SCC. That is, it is difficult to directly change an SCC.

(2) Formation and Change of PCC

In the case where a terminal apparatus transitions from an RRC Idle state to an RRC Connected state, the CC in which connection is established first is the PCC. A change of the PCC is performed through a procedure similar to handover.

A PCC is formed through a procedure called Connection establishment. This procedure is a procedure started with a request from the terminal apparatus side used as a trigger.

A PCC is changed through a procedure called Connection Reconfiguration. This procedure includes transmission and reception of handover messages. This procedure is a procedure started from the base station side.

(3) Addition of SCC

An SCC is added through a procedure called Connection Reconfiguration This procedure is a procedure started from the base station side. An SCC is added to a PCC and belongs to the PCC. Adding an SCC is also referred to as activating an SCC.

(4) Deletion of SCC

An SCC is deleted through a procedure called Connection Reconfiguration. This procedure is a procedure started from the base station side. In this procedure, a specific SCC designated in a message is deleted. Note that deletion of an SCC is performed also through a procedure called Connection Re-establishment. This procedure is a procedure started from the terminal apparatus side. Through this procedure, all the SCCs are deleted. Deleting an SCC is also referred to as deactivating an SCC.

(5) Special Role of PCC

A PCC has a special role different from that of an SCC. For example, transmission and reception of NAS signaling in Connection establishment is performed only in the PCC. In addition, transmission of a physical uplink control channel (PUCCH) is performed only in the PCC. Note that examples of an uplink control signal include ACK or NACK indicating success for failure of reception for data transmitted in downlink a scheduling request, and the like. Moreover, a procedure from detection of Radio Link Failure to Connection Re-establishment is also performed only in the PCC.

(6) LTE Release 12

In LTE Release 12, a scenario is shown in which a macro cell base station and a small cell base station use different frequencies. For example, a frequency of approximately 2 GHz may be allocated to the macro cell base station, and a high frequency such as 5 GHz may be allocated to the small cell base station.

<1.3. Examination Regarding Millimeter-Wave Band>

Examination regarding a millimeter-wave band will be described below.

(1) Definition

In general, a radio wave having a frequency of 3 GHz to 30 GHz (i.e., a wavelength of 1 cm to 10 cm) is also called a centimeter wave. In addition, a radio wave having a frequency of 30 GHz to 300 GHz (i.e., a wavelength of 1 cm to 1 mm) is also called a millimeter wave. In addition, a radio wave having a frequency of 10 GHz to 30 GHz is also called a quasi-millimeter wave. A millimeter-wave band is a frequency band of 6 GHz or higher among the above-mentioned frequencies in the present specification. That is, a millimeter wave in the present specification also conceptually includes a general centimeter wave.

(2) Relationship with Component Carrier

A millimeter-wave band has extensive frequency resources. Thus, LTE release 10 assumes that a bandwidth of a CC having a frequency of 20 MHz can be changed into a wider bandwidth of, for example, 40 MHz, 80 MHz, or 160 MHz in the millimeter-wave band.

(3) Line-of-Sight Communication

A radio wave wanders less and straightness thereof is intensified when it has a higher frequency. In addition, a radio wave attenuates more when reflected if it has a higher frequency. Thus, it can be said that radio waves, particularly those with a frequency of 10 GHz or higher, of a millimeter-wave band are basically assumed to be used in line-of-sight communication.

(4) Radio Wave Propagation Loss in each Frequency Band

Typically, radio wave propagation loss (i.e., path loss) becomes significant and radio waves attenuate in accordance with the square of a frequency For example, a frequency of a 20 GHz band attenuates 12 dB more than a frequency of a 5 GHz band. A frequency of a 60 GHz band attenuates 22 dB more than the frequency of the 5 GHz band.

The millimeter-wave band lies in an extensive band range, for example, from 6 GHz to 60 GHz. It can be said that the millimeter-wave band has an extensive band range when it is compared with LTE currently using the 2 GHz band. In addition, radio waves in the millimeter-wave band do not have a uniform property due to the extensiveness of the band, and there are cases in which radio waves that belong to the same millimeter-wave band have significantly different properties.

It is known that radio waves do not easily reach a destination when the radio waves have higher frequencies of 6 GHz or higher. Thus, in a case in which radio waves of a millimeter-wave band are used to establish a link between a UE and an eNB, it is hard to guarantee that the link can be stably maintained. For this reason, control of radio waves having a higher frequency using radio waves having a lower frequency has been suggested. Actually, in the examination of small cells in LTE Release 12, a technology of controlling a CC of a 5 GHz band using a CC of a 2 GHz band has been discussed.

The millimeter-wave band has resources in a wide range of about 6 GHz to 60 GHz. Thus, even if the resources in the wide range are attempted to be controlled using CCs of the 2 GHz band, resources of the CCs of the 2 GHz band may be insufficient.

(5) Change of Subcarrier Spacing

Subcarrier spacing of orthogonal frequency division multiplexing (OFDM) in LTE at the time of 3GPP Release 12 is 15 kHz. The bandwidth of 15 kHz is defined to be subject to flat fading in units of subcarders. Thus, even when frequency-selective fading occurs in a whole bandwidth (e.g., the bandwidth of 20 MHz), flat fading eventually occurs in units of subcarriers. As described, the bandwidth of 15 kHz is advantageous in that characteristics of a frequency thereof deteriorate little at the time of reception of the frequency It is predicted in the frequency band of 10 GHz to 60 GHz that a frequency width in which occurrence of flat fading can be anticipated becomes large. It is considered possible, for example, to change subcarrier spacing of 15 kHz in the 2 GHz band into subcarrier spacing of 150 kHz in the 20 GHz band.

However, since such a change of subcarrier spacing exerts a great impact on the specifications of LTE, it is hard to assume that subcarrier spacing can be changed without going through stages. Thus, it is considered desirable to change subcarrier spacing in, for example, about four stages of 15 kHz, 30 kHz, 60 kHz, and 120 kHz. This is because, even if subcarrier spacing is divided into more stages, effects brought by more stages are not appreciable when it comes to such a significant change in the specifications. The following table shows an example of a setting of a case in which subcarrier spacing can be changed in four stages.

TABLE 1

| OFDM subcarrier spacing | Frequency | Frequency bandwidth of one CC | Number of CCs |
|---|---|---|---|
| 15 kHz | smaller than 10 GHz | 20 MHz | 30 |
| 30 kHz | 10 GHz to 30 GHz | 40 MHz | 400 |
| 60 kHz | 30 GHz to 60 GHz | 80 MHz | 400 |
| 120 kHz | Higher than 60 GHz | 160 MHz | 200 |

However, even if OFDM subcarrier spacing can be changed in about four stages, the problem of an increasing load of CCs of a low frequency band (e.g., the band of 2 GHz) is still not solved. This is because the millimeter-wave band has extensive frequency resources and a large number of control signals are necessary Referring to Table 1 above, it can be ascertained that there are a large number of CCs to be controlled included in millimeter-wave bands.

Note that there are still questions about whether OFDM is to be employed for bands of 60 GHz or higher. However, even in a case in which a schedule of signals to be handled in accordance with a frequency band to be used is changed, there is no doubt that there are extensive frequency resources and a large number of control targets.

<1.4. LBT>

LBT is a technology for wireless apparatuses to autonomously acquire data transmission rights. Specifically, LBT is a process of transmission performed after checking before transmission whether there is a nearby device (a terminal, an access point, a base station, or the like) which has already been performing transmission using a frequency, expected to be used for the transmission. LTB can also be called carrier sensing or carrier-sense multiple access/collision avoidance (CSMA/CA).

In more detail, each wireless apparatus first stands by in a reception mode and measures reception power in order to check whether another wireless apparatus is transmitting a signal on a channel to be used by the aforementioned wireless apparatus. In a case in which the reception power measured during the standby in the reception mode is lower than a threshold value, the wireless apparatus determines that the channel is in an idle state and the other wireless apparatus is transmitting no signal. On the other hand, in a case in which the reception power measured during the standby in the reception mode is higher than the threshold value, the wireless apparatus determines that the channel is in a busy state and the other wireless apparatus is transmitting a signal. In a case in which transmission of the other wireless apparatus has been confirmed, the wireless apparatus can stand by for a time that is decided with a random number within a certain period of time (e.g., a random number from 0 to 1000 μseconds in accordance with uniform distribution, or the like), and then stand by in the reception mode and measure reception power again. The above-described operation can also be called random back-off.

If the wireless apparatus stands by in the reception mode in a random time and the channel is idle during that time, it is regarded that a transmission right has been acquired and the wireless apparatus performs transmission. On the other hand, if the wireless apparatus stands by in the reception mode in a random time and the channel is not idle during that time, transmission is suppressed. By adopting the above-described mechanism on a wireless network, collisions that may occur when a plurality of wireless terminals simultaneously transmit data using the same frequency band can be reduced and interference can also be minimized The above-described execution of the series of procedures of measuring reception power, checking vacancy, and the like will, also be referred to as, execution of LBT below.

<1.5. Examination Regarding Unlicensed Band>

(1) Unlicensed Band of Millimeter-Wave Band

A licensed band is a band used by a mobile telephone operator or the like under a license.

An unlicensed band is a band that can be used without a license such as Wi-Fi. As described above, a millimeter-wave band is assumed to include not only licensed bands but also unlicensed bands. This is because accepting various wireless access technologies at the same time is efficient. In addition, unlicensed bands are advantageous in that it is easy to allow operators to flexibly use resources.

The millimeter-wave band has extensive resources from 6 GHz to 300 GHz. Thus, such extensive frequency resources are assumed to be managed in units of CCs for the sake of management. In addition, an environment in which several hundreds of CCs having various bandwidth, such as CCs having a bandwidth of 20 MHz, CCs having a bandwidth of 40 MHz, CCs having a bandwidth of 80 MHz, and several hundreds Hz, are mixed is assumed. That is, in a case in which the millimeter-wave band is used, the number of available CCs as well as bandwidths of CCs dramatically increases in comparison to a case in which the millimeter-wave band is not used.

An apparatus that uses an unlicensed band is assumed to perform LBT to check vacancy of frequency bands before transmission. In a case in which the above-described framework of LBT is followed even in the case in which the millimeter-wave band is used, the wireless apparatus executes LBT with all CCs that are scheduled to be used. In that case, the number and bandwidths of CCs to be subject to LBT dramatically increase in comparison to the case in which the millimeter-wave band is not used. Thus, there is concern of LBT becoming more complicated, processing load and power consumption increasing, and transmission opportunities decreasing.

(2) (Licensed-Assisted Access (LAA))

In an unlicensed band, resources have to be secured in a contention base (e.g., a carrier sensing operation such as LBT), and stable channels are not present for eNB and UE at all times. Thus, it is assumed that a CC, in a licensed band is used for controlling UE using, for example, a channel for feeding back an ACK/NACK indicating success or failure in reception of downlink data, or the like.

<1.6. Summary of Points to be Noted when Millimeter-Wave Band is Introduced>

A first point to be noted is that the number of CCs increases. In a case in which the millimeter-wave band is introduced, the number of CCs which are subject to LBT by the wireless apparatus can be enormous.

A second point to be noted is that CCs having frequencies of various bandwidths are mixed. Some pieces of UE can use only the frequency bandwidth of 20 MHz. It is uncertain how such UE behaves with respect to a CC having the frequency bandwidth of 200 MHz.

A third point to be noted is that there are desires for using a plurality of CCs at the same time. Since UE can use extensive frequencies due to the introduction of the millimeter-wave band, improvement of a highest transmission speed when data is transmitted is expected by using a plurality of CCs at the same time. However, in a case in which it is necessary to separately execute LBT with respect to each of the CCs, UE is considered to have a low possibility of using many CCs at the same time due to the above-described concern.

2. Configuration Examples

<2.1. Configuration Example of Base Station>

Figure 3:
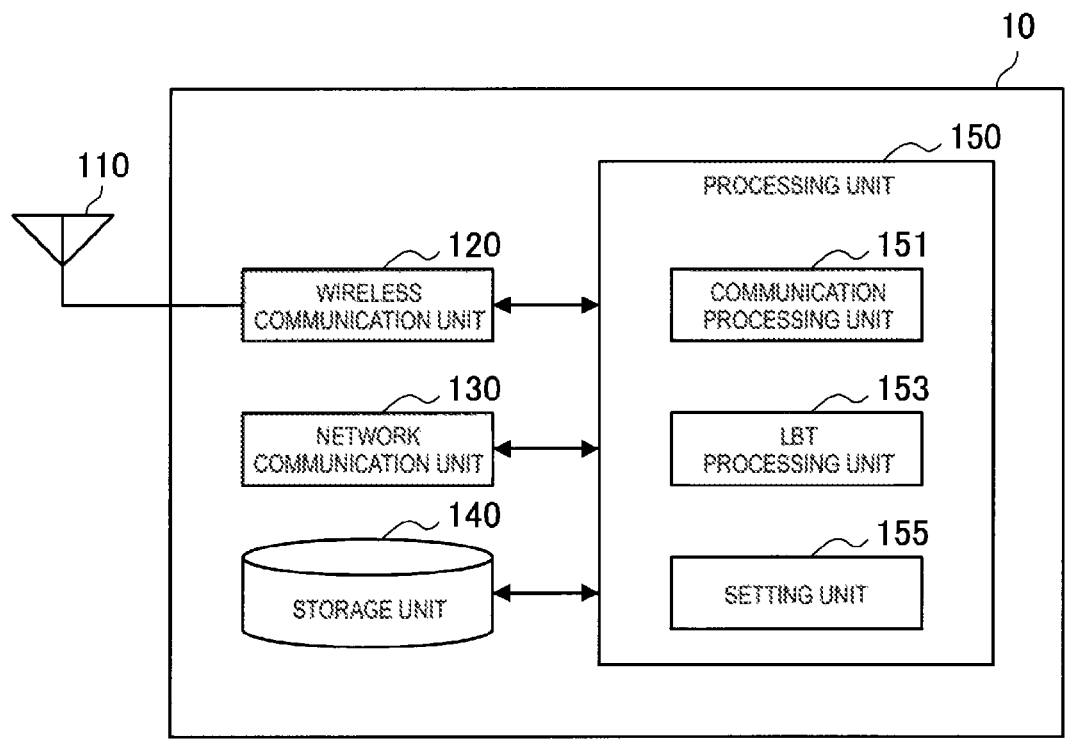
FIG. 3 is a block diagram illustrating an example of the configuration of a base station according to the embodiment.

Next, the configuration of the base station 10 according to an embodiment of the present disclosure will be described with reference to FIG. 3. FIG. 3 is a block diagram illustrating an example of the configuration of the base station 10 according to an embodiment of the present disclosure. Referring to FIG. 3, the base station 10 includes an antenna unit 110, a wireless communication unit 120, a network communication unit 130, a storage unit 140, and a processing unit 150.

1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage unit 140

The storage unit 140 temporarily or permanently stores a program and various data for operation of the base station 10.

(5) Processing Unit 150

The processing unit 150 provides various functions of the base station 10. The processing unit 150 includes a communication processing unit 151, an LBT processing unit 153, and a setting unit 155. Note that the processing unit 150 may further include a structural element other than these structural elements. That is, the processing unit 150 may perform operation other than the operation of these structural elements.

Operations of the communication processing unit 151, the LBT processing unit 153, and the setting unit 155 will be described below in detail, <2.2. Configuration Examples of Terminal Apparatus>

Figure 4:
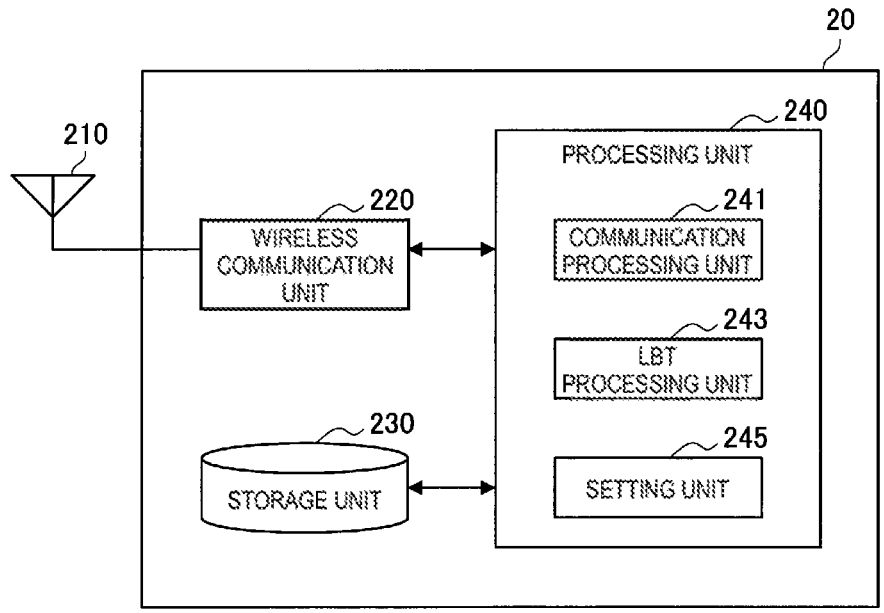
FIG. 4 is a block diagram illustrating an example of the configuration of a terminal apparatus according to the embodiment.

Next, an example of the configuration of the terminal apparatus 20 according to an embodiment of the present disclosure will be described with reference to FIG. 4. FIG. 4 is a block diagram illustrating an example of the configuration of the terminal apparatus 20 according to an embodiment of the present disclosure. Referring to FIG. 4, the terminal apparatus 20 includes an antenna unit 210, a wireless communication unit 220, a storage unit 230 and a processing unit 240.

(1) Antenna Unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various data for operation of the terminal apparatus 20.

(4) Processing Unit 240

The processing unit 240 provides various functions of the terminal apparatus 20. The processing unit 240 includes a communication processing unit 241, an LBT processing unit 243, and a setting unit 245. Note that the processing unit 240 may further include a structural element other than these structural elements. That is, the processing unit 240 may perform operation other than the operation of these structural elements.

Operations of the communication processing unit 241, the LBT processing unit 243, and the setting unit 245 will be described below in detail.

3. First Embodiment

<3.1. Technical Problems>

In a case in which the millimeter-wave band is used, the number of CC's to be subject to LBT can be enormous. In addition, in a case in which it is determined as a result of LBT that another apparatus has already been using a frequency that was scheduled to be used, it is necessary to stand by or search for another available CC, and thus it is difficult to secure aright to simultaneously use many CCs.

<3.2. Technical Features>

(1) Grouping of CCs

The present embodiment defines a group that includes some CCs among a plurality of CCs available for the base station 10. This group includes at least one (typically a plurality of) CC(s). This group will be referred to as an LBT group below. One LBT group includes at least one LBT primary CC. In addition, the number of CCs included in an LBT group will be regarded as a level of the LBT group. Examples of an LBT group are illustrated in FIG. 5 to FIG. 8.

Figure 5:
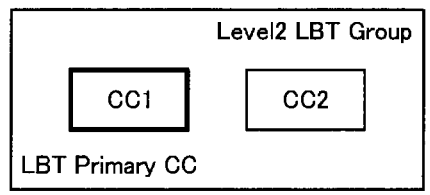
FIG. 5 is an explanatory diagram for describing a technical feature of a first embodiment.
Figure 6:
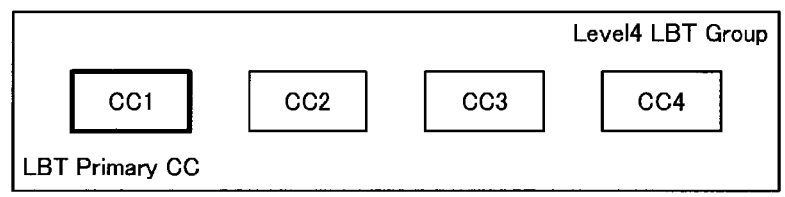
FIG. 6 is an explanatory diagram for describing a technical feature of the embodiment.
Figure 7:
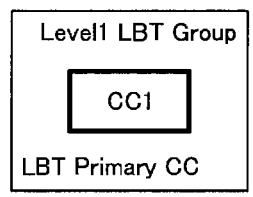
FIG. 7 is an explanatory diagram for describing a technical feature of the embodiment.
Figure 8:
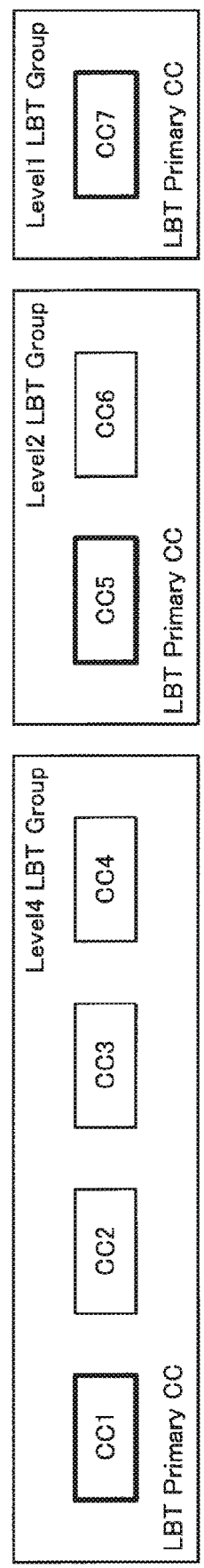
FIG. 8 is an explanatory diagram for describing a technical feature of the embodiment.

FIG. 5 illustrates an example of a Level 2 LBT group formed with two CCs, and CC1 is an LBT primary CC. FIG. 6 illustrates an example of a Level 4 LBT group formed with four CCs, and CC1 is an LBT primary CC. FIG. 7 illustrates an example of a Level 1 LBT group formed with one CC, and CC1 is an LBT primary CC. As illustrated in FIG. 8, LBT groups of different levels can be mixed. Note that an LBT primary CC corresponds to a first unit frequency band, and CCs included in an LBT group other than an LBT primary CC correspond to second unit frequency bands.

The number of CCs included in one LBT group is arbitrary. In addition, a wireless apparatus (e.g., the LBT processing unit 153 of the base station 10 or the LBT processing unit 243 of the terminal apparatus 20) selects an LBT group to be subject to LBT on the basis of the number of CC's included in the LBT group. For example, the wireless apparatus selects an LBT group including the number of CCs that are desired to be simultaneously used. Accordingly the wireless apparatus can selectively set an LBT group including the number of CCs that the wireless apparatus desires to simultaneously use as a target of LBT.

As illustrated in FIG. 5 to FIG. 8, it is desirable for the number of CCs included in an LBT group to be a power of 2. This is to facilitate operations of the LBT groups in a case in which a plurality of LBT groups form a hierarchical structure as will be described in a second embodiment below.

(2) LBT

A wireless apparatus (e.g., the LBT processing unit 153 of the base station 10 or the LBT processing unit 243 of the terminal apparatus 20) executes LBT in units of LBT groups.

In detail, the wireless apparatus infers a result of LBT related to CCs other than an LBT primary CC included in an LBT group on the basis of a result of LBT related to the LBT primary CC. Specifically, the wireless apparatus infers that a result of LBT related to the CCs other than the LBT primary CC included in the LBT group is the same as a result of LBT of the LBT primary CC. For example, in a case in which the LBT primary CC is in an idle state, the wireless apparatus infers that the entire LBT group is in an idle state. Accordingly, the wireless apparatus can use all of the CCs included in the LBT group for a predetermined period of time (e.g., 4 ms (milliseconds)). On the other hand, in a case in which the LBT primary CC is in a busy state, the wireless, apparatus infers that the entire LBT group is in the busy state. In a case of using a plurality of CCs included in the LBT group, the wireless apparatus may execute LBT targeting only the LBT primary CC. Accordingly, the wireless apparatus can minimize the number of CCs to be subject to LBT and thus can efficiently execute LBT.

However, an LBT primary CC being in an idle state does not hinder execution of LBT with respect to the other CCs included in an LBT group. The wireless apparatus may perform LBT for the other CCs included in the LBT group before performing communication using the other CCs even if the LBT primary CC is confirmed to be in an idle state. Accordingly, collision avoidance and interference suppression are reliably realized.

(3) Communication

The wireless apparatus (e.g., the communication processing unit 151 of the base station 10 or the communication processing unit 241 of the terminal apparatus 20) performs communication on the basis of a result of LBT.

For example, the wireless apparatus determines whether to perform communication using CCs in units of LBT groups. Specifically, the wireless apparatus performs communication using an LBT group that is inferred to be in the idle state. At this time, the wireless apparatus communicates with another apparatus using at least an LBT primary CC thereof. Accordingly, the LBT primary CC is determined to be in the busy state when LBT is executed by another wireless apparatus, and thus a collision can be avoided.

(4) Setting

The wireless apparatus (e.g., the setting unit 155 of the base station 10 or the setting unit 245 of the terminal apparatus 20) performs a setting of an LBT group and a setting of an LBT primary CC of each LBT group.

To that end, the wireless apparatus acquires information indicating a plurality of CCs included in each LBT group (i.e., information indicating which CC belongs to which LBT group). Such information will also be referred to as group information below. In addition, the wireless apparatus acquires information indicating an LBT primary CC of each LBT group (i.e., information indicating which CC is an LBT primary CC. Such information will also be referred to as primary information below. The wireless apparatus can perform a setting, of an LBT group and a setting of an LBT primary CC of each LBT group by acquiring group information and primary information.

For example, the small cell base station 10A acquires group information and primary information from a mobile telephone operator. Alternatively, the base station 10A may acquire the information through an interface such as Operation & Maintenance (O&M). In addition, the AP 10B acquires (i.e., receives input of) group information and primary information at the time of, for example, shipment at a factory Furthermore, the terminal apparatus 20 acquires group information and primary information from, for example, the small cell base station 10A, the macro cell base station 30 or the AP 10B. From another perspective, the wireless apparatus (the small cell base station 10A, the macro cell base station 30, or the AP 10B) notifies the terminal apparatus 20 of the group information and primary information.

It is desirable for such group information and primary information to be common in all wireless communication systems included in the system 1. More specifically, it is desirable for the group information and primary information to be common in different service providers, and a cellular system and a network based on another communication standard such as the Wi-Fi system.

The technical features of the present embodiment are as described above.

<3.3. Flow of Process>

(1) Flow of LBT

Figure 9:
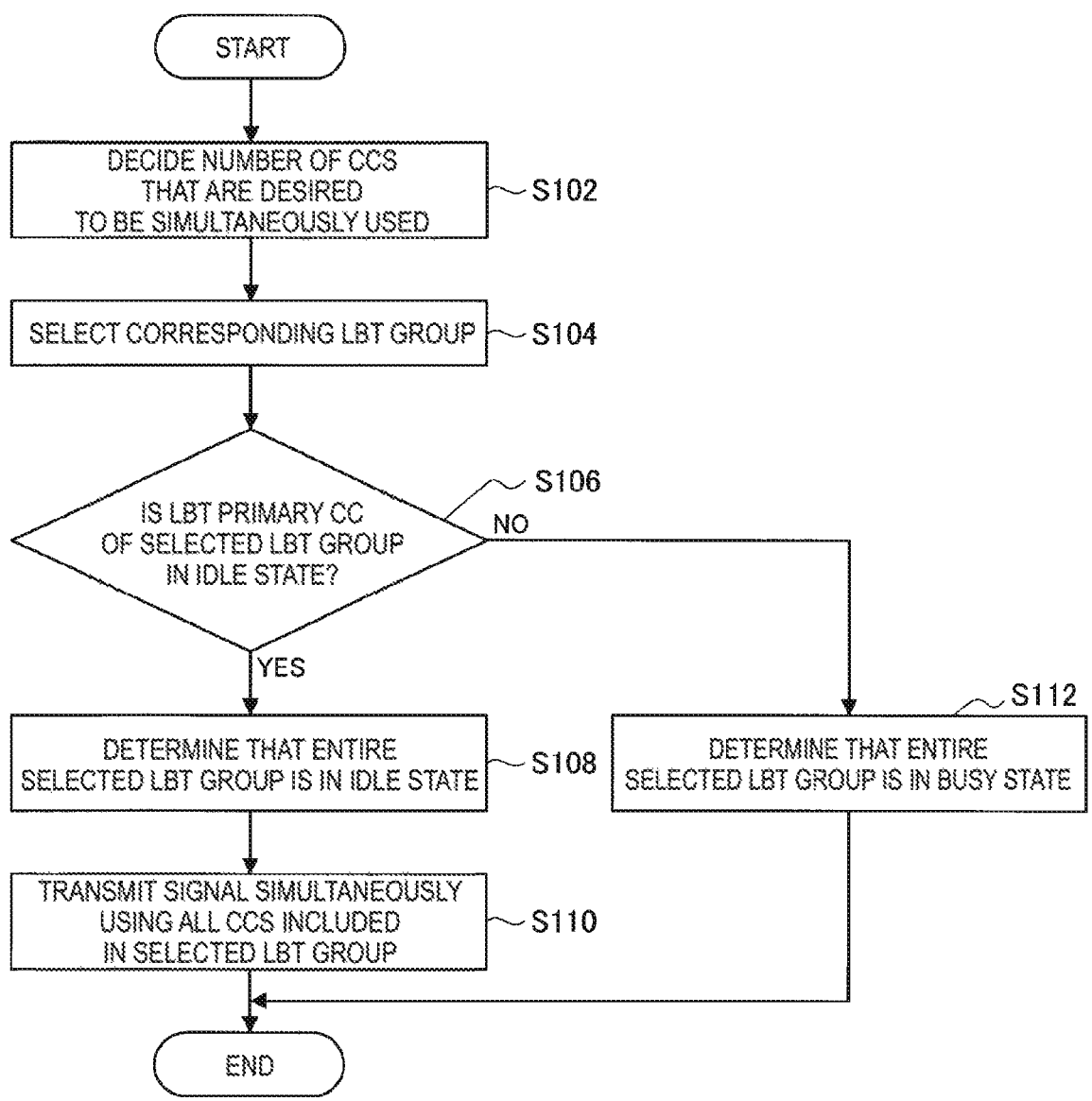
FIG. 9 is a flowchart showing an example of a flow of an LBT process executed by the terminal apparatus according to the embodiment.

FIG. 9 is a flowchart showing, an example of a flow of an LBT process executed by the terminal apparatus 20 according to the present embodiment.

First, the terminal apparatus 20 (e.g., the communication processing unit 241) decides the number of CCs (i.e., Level) that are desired to be simultaneously used (Step S102) as shown in FIG. 9.

Next, the terminal apparatus 20 (e.g., the LBT processing unit 243) selects an LBT group corresponding to the number of CCs that the terminal apparatus desires to use (Step S104). For example, the terminal apparatus 20 preferentially selects an LBT group including the number of CCs that coincides with the number of CCs that the terminal apparatus desires to use.

Next, the terminal apparatus 20 (e.g., the LBT processing unit 243) measures reception power of an LBT primary CC of the selected LBT group and determines whether the LBT primary CC is in the idle state (Step S106).

In a case in which the LBT primary CC is determined to be in the idle state (YES in Step S106), the terminal apparatus 20 (e.g., the LBT processing unit 243) determines that all CCs of the selected LBT group are in the idle state (Step S108). Then, the terminal apparatus 20 (e.g., the communication processing unit 241) transmits signals simultaneously using all of the CCs included in the selected LBT group (Step S110).

On the other hand, in a case in which the LBT primary CC is determined to be in the busy state (NO in Step S106), the terminal apparatus 20 (e.g., the LBT processing unit 243) determines that all CCs of the selected LBT group are in the busy state (Step S112). In this case, the terminal apparatus 20 returns to Step S104 again to select a different LBT group and then can repeat the succeeding processes.

Accordingly, the process ends. Note that, although the terminal apparatus 20 is described as a subject of the process in the above description, the base station 10 may be a subject of the process.

(2) Overall Flow of Process

Figure 10:
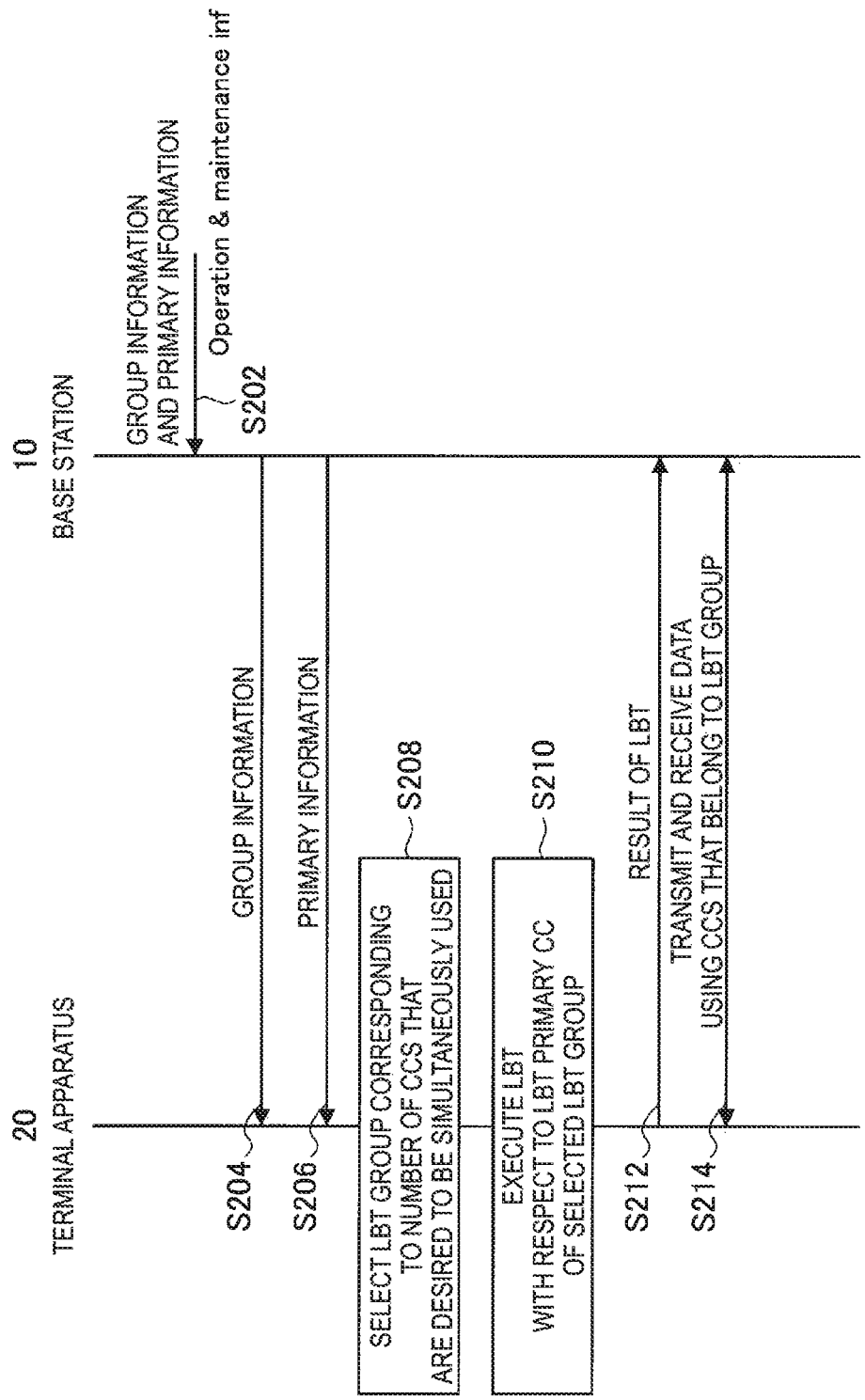
FIG. 10 is a sequence diagram showing an example of a flow of a communication process executed in a system according to the embodiment.

FIG. 10 is a sequence diagram showing an example of a flow of a communication process executed in the system 1 according to the present embodiment. The base station 10 and the terminal apparatus 20 are involved in this sequence. The sequence is an example of a case in which the terminal apparatus 20 performs LBT.

First, the base station 10 acquires group information and primary information (Step S202) as shown in FIG. 10. Next, the base station 10 notifies the terminal apparatus 20 of the group information (Step S204) and then notifies the terminal apparatus 20 of the primary information (Step S206).

Next, the terminal apparatus 20 selects an LBT group corresponding to the number of CCs that are desired to be simultaneously used (Step S208). Then, the terminal apparatus 20 executes LBT with respect to a primary CC of the selected LBT group (Step S210). Then, the terminal apparatus 20 notifies the base station 10 of information indicating a result of the LBT (Step S212). The base station 10 can establish an uplink schedule and/or a downlink schedule on the basis of the information indicating the result of the LBT.

Then, the base station 10 and the terminal apparatus 20 transmit and receive data to and from each other using CCs that belong to the LBT group to which the LBT primary CC determined to be in the idle state belongs (Step S214).

Thereby the process ends.

Figure 11:
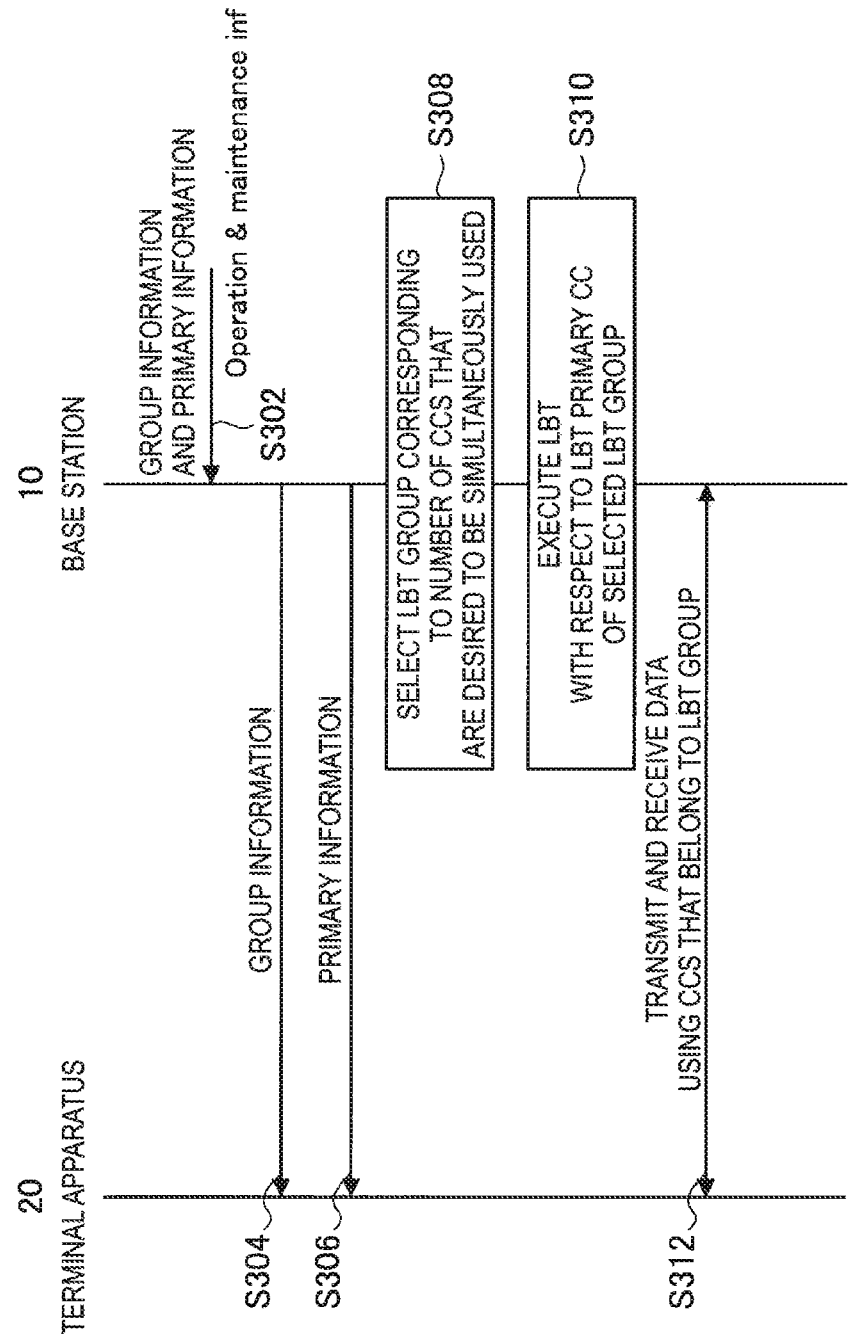
FIG. 11 is a sequence diagram showing an example of a flow of a communication process executed in a system according to the embodiment.

FIG. 11 is a sequence diagram showing an example of a flow of another communication process executed in the system 1 according to the present embodiment The base station 10 and the terminal apparatus 20 are involved in this sequence. The sequence is an example of a case in which the base station 10 performs LBT.

First, the base station 10 acquires group information and primary information (Step S302) as shown in FIG. 11. Next, the base station 10 notifies the terminal apparatus 20 of the group information (Step S304), and then notifies the terminal apparatus 20 of the primary information (Step S306).

Next, the base station 10 selects an LBT group corresponding to the number of CCs that the base station 10 desires to use (Step S308). Then, the base station 10 executes LBT with respect to the primary CC of the selected LBT group (Step S310).

Then, the base station 10 and the terminal apparatus 20 transmit and receive data to and from each other using CCs that belong to the LBT group to which the LBT primary CC determined to be in the idle state belongs (Step S312).

Thereby, the process ends.

4. Second Embodiment

<4.1. Technical Problems>

A case in which the numbers of CCs that each of wireless apparatuses desires to simultaneously use are different due to various factors such as limit on capabilities or capacities of transmission data of the wireless apparatuses is considered. In addition, a case in which wireless apparatuses that desire different numbers of CCs to be simultaneously used are mixed is also considered. It is desirable even in such cases to provide a mechanism for efficiently executing LBT.

In addition, although millimeter-wave bands are extensive, if a Level 2 LBT group is intensively used, for example, resources of the Level 2 LBT group are depleted, and thus a case in which a Level 4 LBT group is used instead is conceivable. In this case, four CCs are occupied even though two CCs are sufficient originally, which can be said as being inefficient. Thus, it is desirable to efficiently make CCs in groups.

<4.2. Technical Features>

(1) Hierarchical Structure

In the present embodiment, an LBT group includes sets of low-ranking LBT groups each including a smaller number of CCs. That is, LBT groups according to the present embodiment have a hierarchical structure in which a high-ranking LBT group includes sets of low-ranking LBT groups. An example of the hierarchical structure is illustrated in FIG. 12.

Figure 12:
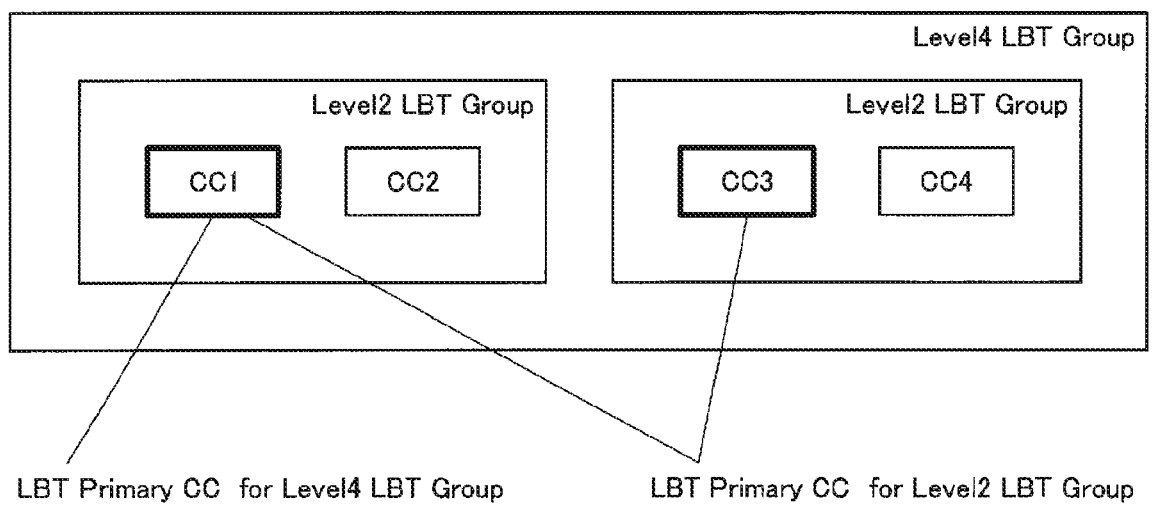
FIG. 12 is an explanatory diagram for describing a technical feature of a second embodiment.

In the example illustrated in FIG. 12, a Level 4LBT group including a CC1 to a CC4 is formed with a Level 2 LBT group including the CC1 and the CC2 and another Level 2 LBT group including the CC3 and the CC4. With the above-described hierarchical structure, flexibly grouping of the four CCs in which these CCs are handled as the Level 4 LBT group 1 or the two Level 2 LBT groups is realized, and thus the resources can be efficiently utilized.

Here, an LBT primary CC of a high-ranking LBT group coincides with an LBT primary CC of at least one low-ranking LBT group. In the example illustrated in FIG. 12, an LBT primary CC of the Level 2 LBT group including the CC1 and the CC2 is the CC1. An LBT primary CC of the Level 2 LBT group including the CC3 and the CC4 is the CC3. An LBT primary CC of the Level 4 LBT group including the CC1 to the CC4 is the CC1. According to the above description, the CC1 is the LBT primary CC of the Level 2 LBT group and also the LBT primary CC of the Level 4 LBT group. Due to this coincidence, efficient execution of LBT as will be described below is realized.

(2) LBT

Execution of LBT with respect to LBT groups in the above-described hierarchical structure will be examined as follows.

When the CC1 is found to be in the idle state as a result of execution of LBT using the CC1, it is ascertained that the CC1 and the CC2 are not being used. Meanwhile there is a possibility of the CC3 and the CC4 being used. This is because it is difficult to detect the presence of another wireless apparatus which is using the CC3 and the CC4 as the Level 2 LBT group in LBT targeting the CC1.

When the CC1 is found to be in the busy state as a result of execution of LBT using the CC1, there is a possibility of all of the CC1 to the CC4 being used and a possibility of only the CC1 and the CC2 being used and the CC3 and the CC4 not being used.

When the CC3 is found to be in the idle state as a result of execution of LBT using the CC3, it is ascertained that the CC3 and the CC4 are not being used. Meanwhile, there is a possibility of the CC1 and the CC2 being used.

When the CC3 is found to be in the busy state as a result of execution of LBT using the CC3, there is a possibility of all of the CC1 to the CC4 being used and a possibility of only the CC3 and the CC4 being used and the CC1 and the CC2 not being used. Thus, it is necessary to execute LBT again using the CC1.

According to the above description, executing LBT with the CC1 can be said to be more efficient than executing LBT with the CC3 when a Level 2 LBT group is desired to be used. In addition, since a case in which, while the Level 4 LBT group is secured, only some of the group (e.g., CC1 and CC2) are used can also be assumed, it is hard to say that the CC3 is certainly available since, the CC3 is in the idle state. Thus, in a case in which use of a Level 2 LBT group is desired, executing LBT with the CC1 can be said to be more efficient than executing LBT with the CC3.

Thus, the wireless apparatus (e.g., the LBT processing unit 153 of the base station 10 or the LBT processing unit 243 of the terminal apparatus 20) preferentially sets an LBT primary CC that coincides with that of a higher-ranking group as a target of LBT. When it comes to the example illustrated in FIG. 12, in a case in which the wireless apparatus desires to use a Level 2 LBT group, the CC1 that also serves as the LBT primary CC of the Level 4 LBT group is set as a target of LBT. In a case in which the CC1 is in the busy state as a result of LBT, the wireless apparatus regards the CC3 as also being in the busy state, and thus can omit LBT with the CC3. In addition, in a case in which the CC1 is in the idle state as a result of LBT, the wireless apparatus can use the CC1 and the CC2 without performing LBT with the CC3.

5, Third Embodiment

<5.1. Technical Problems>

According to the second embodiment, there is a case in which, while the number of LBT operations to be executed can be reduced, it is necessary to execute the operation multiple times to ascertain whether each of CCs is being used. This can be a cause of lowered use efficiency of CCs. Thus, it is desirable to provide a mechanism in which whether each of CCs is being used can be ascertained through one LBT operation no matter what kind of hierarchical structure is formed.

<5.2. Technical Features>

(1) LBT Pilot Resource

In the present embodiment, a use situation of each CC included in an LBT group is represented by an LBT primary CC. Specifically, a signal indicating whether communication using each CC included in an LBT group is being performed is transmitted on each of resources included in an LBT primary CC. Such an LBT primary CC will be described with reference to FIG. 13 to FIG. 15 in more detail below.

Figure 13:
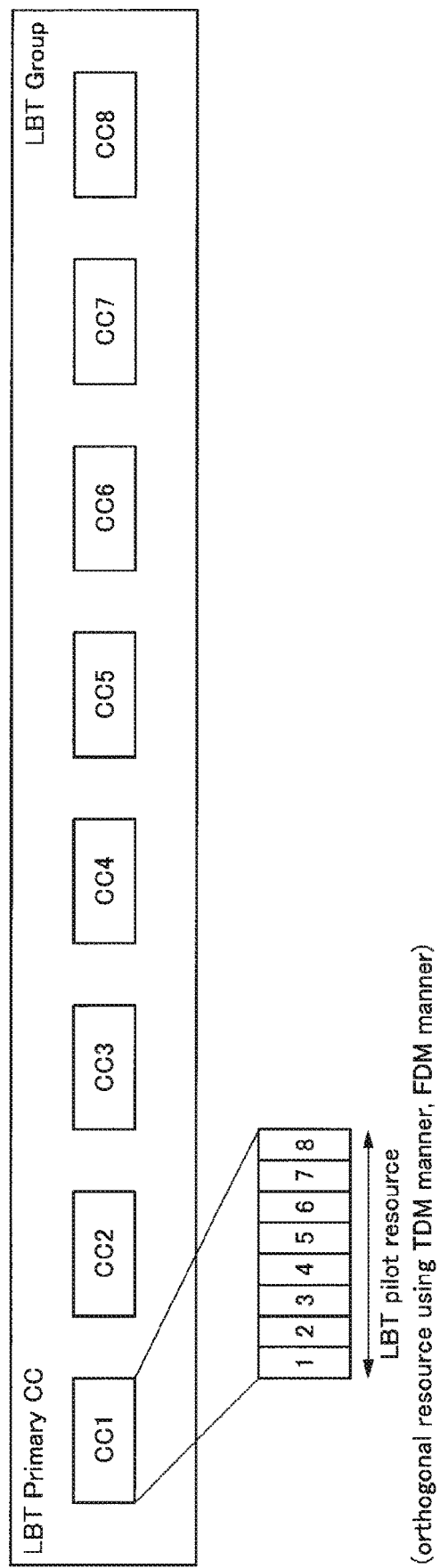
FIG. 13 is an explanatory diagram for describing a technical feature of a third embodiment.

In the example illustrated in FIG. 13, eight CCs are forming an LBT group and the CC1 is an LBT primary CC. In addition, a signal indicating whether each of the CCs included in the LBT group is in the idle state or the busy state is transmitted on each of eight resources included in the CC1. A resource on which a signal indicating whether a CC included in an LBT group is in the idle state or the busy state is transmitted will also be referred to as an LBT pilot resource below. It is desirable for LBT pilot resources to be orthogonal resources that are orthogonal to each other. In the example illustrated in FIG. 13, eight LBT pilot resources are secured.

Figure 14:
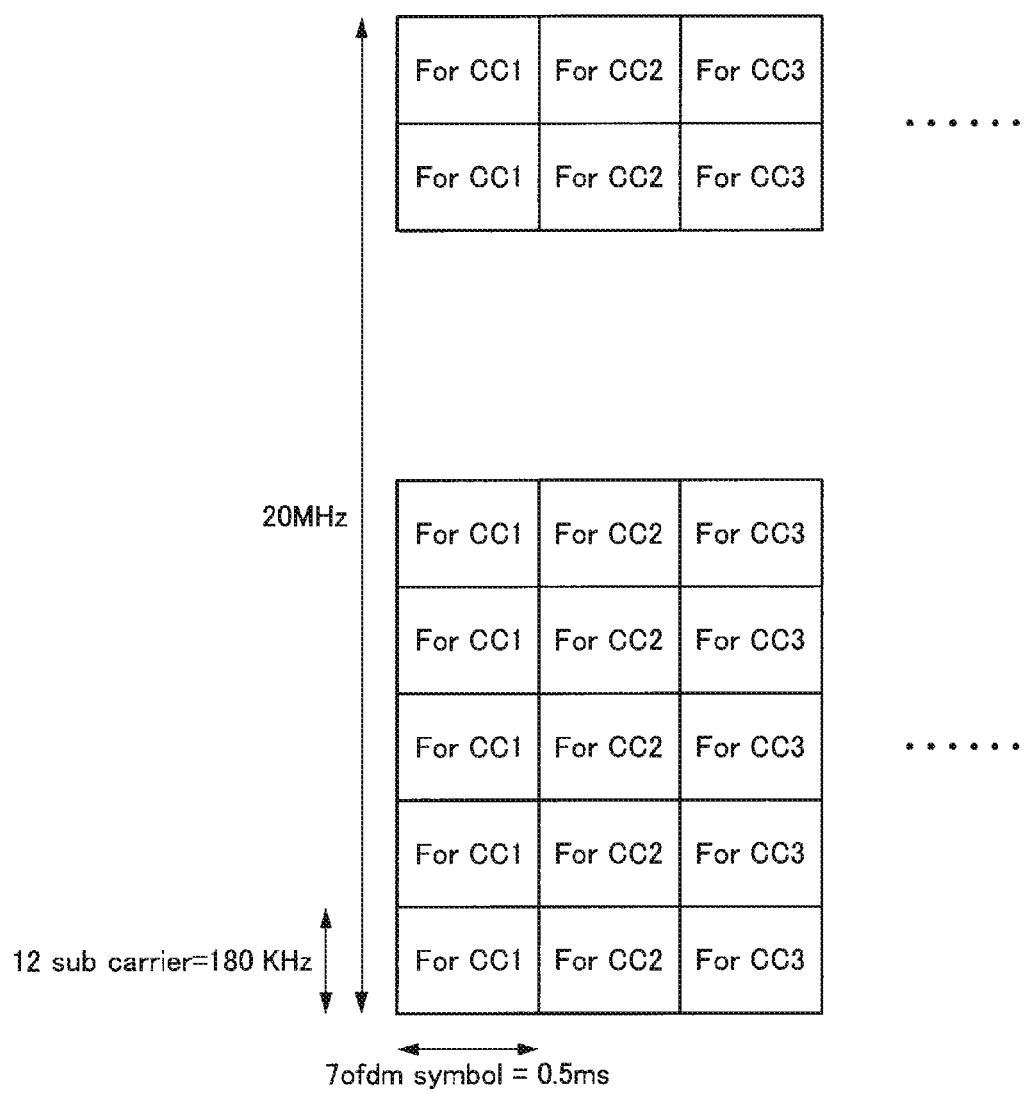
FIG. 14 is an explanatory diagram for describing a technical feature of the embodiment.

The LBT pilot resources may be resources obtained by dividing the LBT primary CC by a time domain (i.e., resources of time division multiplexing (TDM)). In this case, one LBT pilot resource divided by the time domain corresponds to one CC, and a signal indicating whether the CC is in the idle state or the busy state is transmitted using the LBT pilot resource. An example of a resource configuration of the CC1 in a case in which the CC1 is divided by the time domain is illustrated in FIG. 14. In FIG. 14, radio resources are divided to be resource blocks each including twelve subcarriers and seven orthogonal frequency division multiplexing (OFDM) symbols. A bandwidth of each resource block is 180 KHz and a time length thereof is 0.5 ms. A bandwidth of the CC1 is 20 MHz. In the example illustrated in FIG. 14, resource blocks of different time slots are used for different CCs.

Figure 15:
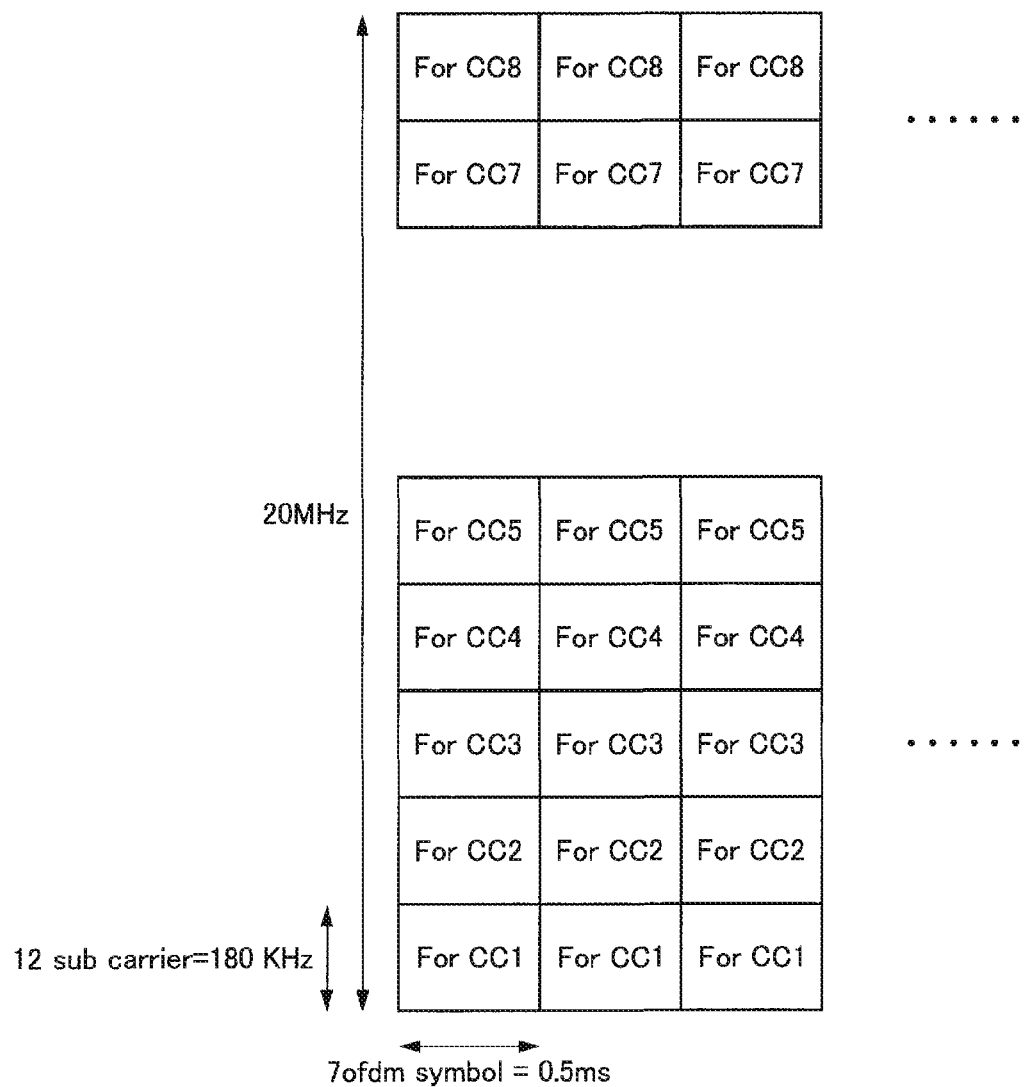
FIG. 15 is an explanatory diagram for describing a technical feature of the embodiment.

The LBT pilot resources may be resources obtained by dividing the LBT primary CC by a frequency domain (i.e., resources of frequency division multiplexing (FDM)). In this case, one LBT pilot resource divided by the frequency domain corresponds to one CC, and a signal indicating whether the CC is in the idle state or the busy state is transmitted using the LBT pilot resource. An example of a resource configuration of the CC1 in a case in which the CC1 is divided by the frequency domain is illustrated in FIG. 15. In FIG. 15, radio resources are divided to be resource blocks each including twelve subcarriers and seven OFDM symbols. A bandwidth of each resource block is 180 KHz and a time length thereof is 0.5 ms. A bandwidth of the (CC1 is 20 MHz. In the example illustrated in FIG. 15, resource blocks of different frequency bands are used for different CCs.

In addition, although dividing a CC by a code domain can also be considered, the method is hard to be said to be appropriate in a case in which use of energy detection (i.e., determination on the basis of reception power) that is a basic LBT method is assumed. When the TDM scheme and the FDM scheme are compared, the TDM scheme is considered to be more desirable. The reason for this is that, in the TDM scheme, a wireless apparatus may measure reception power using an entire bandwidth of a CC, LBT can be executed immediately after an A/D converter, and thus a circuit configuration thereof can be simplest.

(2) Setting

The wireless apparatus (e.g., the setting unit 155 of the base station 10 or the setting unit 245 of the terminal apparatus 20) performs setting of LBT pilot resources of an LBT primary CC.

To this end, the wireless apparatus acquires information indicating a correspondence relationship between LBT pilot resources included in the LBT primary CC and CCs (information indicating which LBT pilot resource corresponds to which CC). Such information will also be referred to as pilot resource information below. In the reverse perspective, the wireless apparatus can be said to notify another apparatus of the pilot resource information. It is desirable for pilot resource information to be shared by all the wireless communication systems included in the system 1.

(3) LBT

The wireless apparatus (e.g., the LBT processing unit 153 of the base station 10 or the LBT processing unit 243 of the terminal apparatus 20) performs LBT with respect to LBT pilot resources. Then, the wireless apparatus infers that a result of LBT related to each of LBT pilot resources is a result of LBT related to each of corresponding CCs. For example, in a case in which only LBT pilot resource 2 and 3 are in the idle state among LBT pilot resources 1 to S in the example illustrated in FIG. 13, the wireless apparatus determines that the CC2 and the CC3 are not being used by another wireless apparatus and thus are available. As described, the wireless apparatus can ascertain use situations of other CCS included in the LBT group only by executing LBT with respect to the LBT primary CC.

Here, a wireless apparatus that does not employ the technology of the present embodiment may individually execute LBT for each of CCS. Thus, the technology of the present embodiment can be said to be a technology with backward compatibility.

(4) Communication

In a case in which a signal is to be transmitted using a CC, the wireless apparatus (e.g., the communication processing unit 151 of the base station 10 or the communication processing unit 241 of the terminal apparatus 20) transmits the signal using a corresponding LBT pilot resource. Any signal may be used as long as another wireless apparatus detects a signal with the same power density (dBm/Hz) as in a case in which LBT (i.e., energy detection) is executed for an original CC. This signal will also be referred to as an LBT pilot signal below. In a case in which a signal is to be transmitted using the CC2 and the CC3 in the example illustrated in FIG. 13, for example, the wireless apparatus transmits an LBT pilot signal using LBT pilot resources 2 and 3. Accordingly, when another wireless apparatus executes LBT, the LBT pilot resources are determined to be in the busy state, and thus a collision can be avoided.

The wireless apparatus (e.g., the communication processing unit 151 of the base station 10 or the communication processing unit 241 of the terminal apparatus 20) may transmit an LBT pilot signal at transmission power according to radio wave propagation characteristics of a corresponding CC. There are cases in which frequencies of CCs included in an LBT group are far from each other and CCs have significantly different levels of propagation propagation loss. The reason for this is that, if uniform transmission power is used in such cases, there is concern of a result of LBT (i.e., reception power) for an LBT pilot resource being different from a result of LBT for an original CC.

Specifically, the wireless apparatus selects a CC having a lowest frequency among CCs included in an LBT group and allocates reference transmission power thereto. Then, the wireless apparatus allocates lower levels of transmission power than the reference transmission power to the CCs having higher frequencies. For example, in a case in which the CC2 has radio wave propagation loss 10 dB greater than the CC1, the wireless apparatus sets transmission power of LBT pilot resource 2 of the CC1 to be 10 dB lower than LBT pilot resource 1. Accordingly, the LBT pilot resources can represent use situations of the CCs in addition to radio wave propagation loss.

<5.3. Flow of Process>

(1) Flow of Signal Transmission

Figure 16:
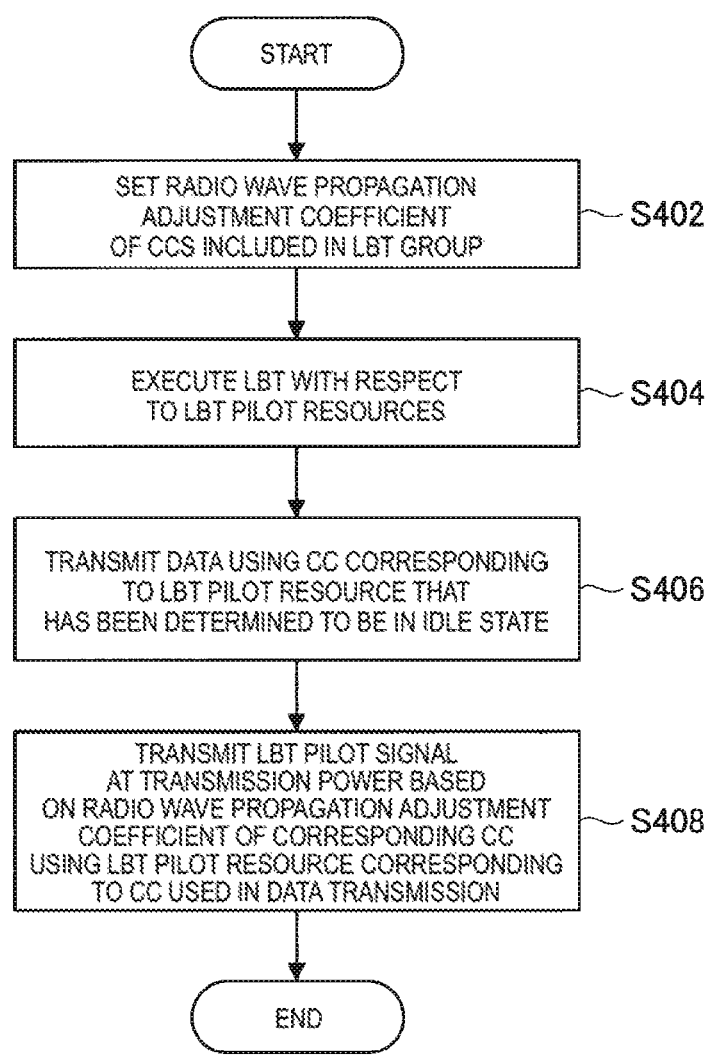
FIG. 16 is a flowchart showing an example of a flow of a signal transmission process executed by a terminal apparatus according to the embodiment.

FIG. 16 is a flowchart showing an example of a flow of a signal transmission process executed by the terminal apparatus 20 according to the present embodiment.

As shown in FIG. 16, the terminal apparatus 20 (e.g., the setting unit 245) sets a radio wave propagation adjustment coefficient of CCs included in an LBT group (Step S402).

Next, the terminal apparatus 20 (e.g., the LBT processing unit 243) executes LBT with respect to LBT pilot resources (Step S404).

Next, the terminal apparatus 20 (e.g., the communication processing unit 241) transmits data using a CC corresponding to an LBT pilot resource that has been determined to be in the idle state (Step S406).

Then, the terminal apparatus 20 (e.g., the communication processing unit 241) transmits an LBT pilot signal at transmission power based on the radio wave propagation adjustment coefficient of the CC using the LBT pilot resource corresponding to the CC, used in the data transmission of Step S406 (Step S408).

Thereby, the process ends. Note that, although the terminal apparatus 20 is described as a subject of the process above, the base station 10 may be a subject of the process.

(2) Flow of Overall Process

Figure 17:
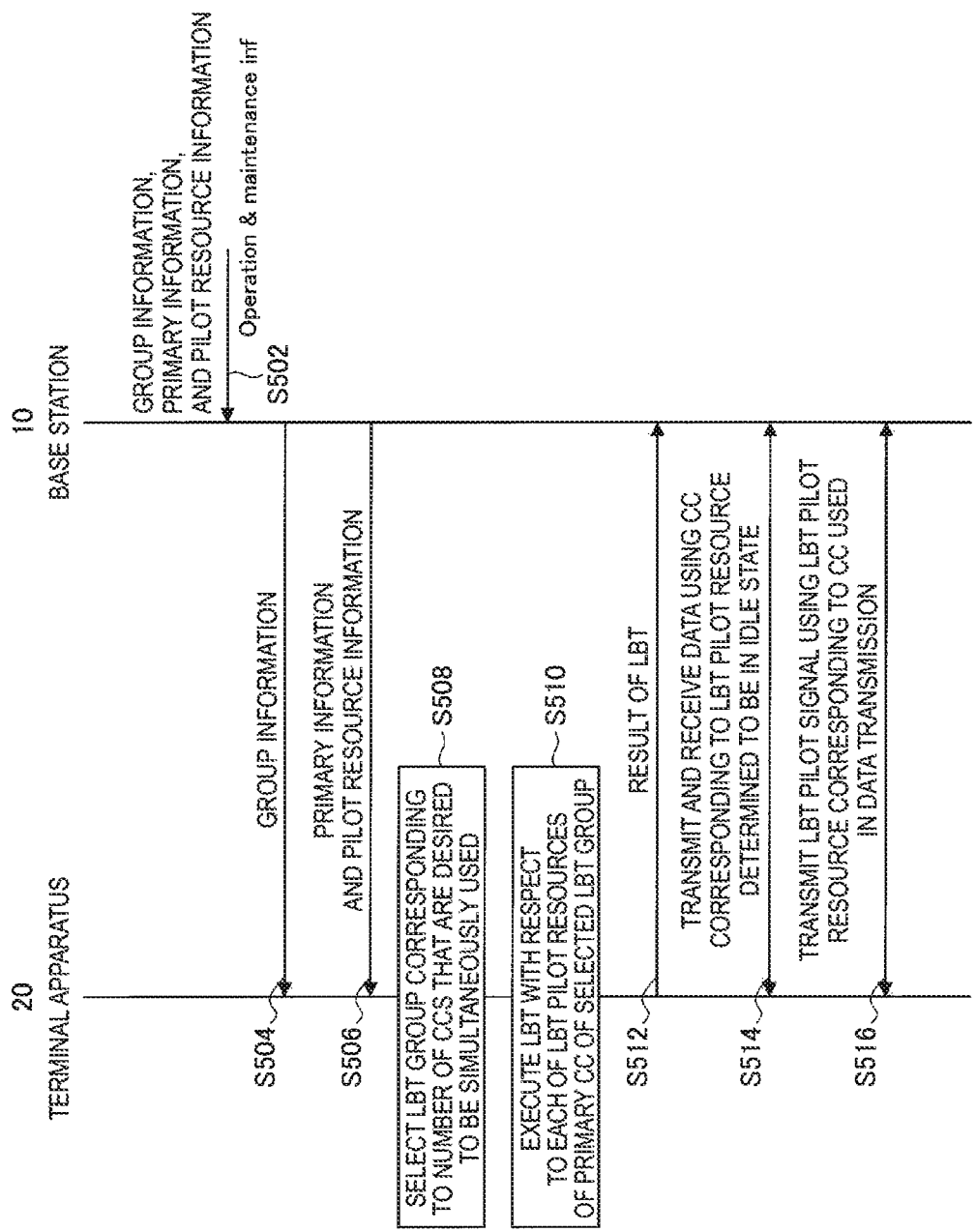
FIG. 17 is a sequence diagram showing an example of a flow of a communication process executed in a system according to the embodiment.

FIG. 17 is a sequence diagram showing, an example of a flow of a communication process executed in the system 1 according to the present embodiment. The base station 10 and the terminal apparatus 20 are involved in this sequence. The sequence is an example of a case in which the terminal apparatus 20 performs LBT.

First, the base station 10 acquires group information, primary information, and pilot resource information (Step S502) as shown in FIG. 17. Next, the base station 10 notifies the terminal apparatus 20 of the group information (Step S504), and then notifies the terminal apparatus 20 of the primary information and the pilot resource information (Step S506).

Next, the terminal apparatus 20 selects an LBT group corresponding to the number of CCs that are desired to be simultaneously used (Step S508). Next, the terminal apparatus 20 executes LBT with respect to each of LBT pilot resources of a primary CC of the selected LBT group (Step S510). Then, the terminal apparatus 20 notifies the base station 10 of information indicating a result of the LBT (Step S512).

Then, the base station 10 and the terminal apparatus 20 transmit and receive data to and from each other using a CC corresponding to the LBT pilot resource determined to be in the idle state (Step S514). In addition, the base station 10 or the terminal apparatus 20 (specifically, a data transmission source) transmits an LBT pilot signal using the LBT pilot resource corresponding to the CC used in the data transmission (Step S516).

Thereby the process ends.

Figure 18:
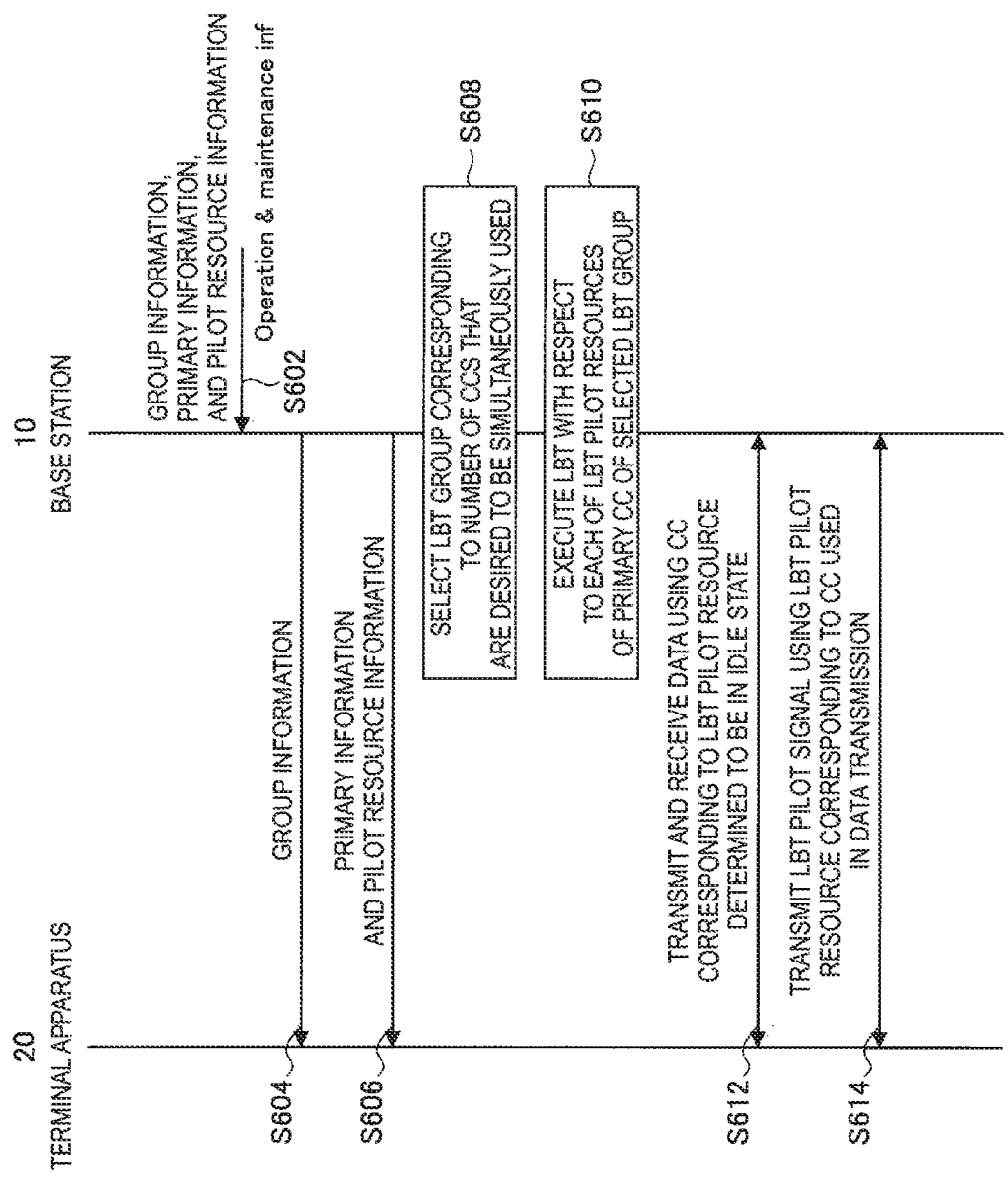
FIG. 18 is a sequence diagram showing an example of a flow of a communication process executed in a system according to the embodiment.

FIG. 18 is a sequence diagram showing an example of a flow of another communication process executed in the system 1 according to the present embodiment. The base station 10 and the terminal apparatus 20 are involved in this sequence The sequence is an example of a case in which the base station 10 performs LBT First, the base station 10 acquires group information, primary information, and pilot resource information (Step S602) as shown in FIG. 18. Next, the base station 10 notifies the terminal apparatus 20 of the group information (Step S604), and then notifies the terminal apparatus 20 of the primary information and the pilot resource information (Step S606).

Next, the base station 10 selects an LBT group corresponding to the number of CCs that are desired to be simultaneously used (Step S608). Next, the base station 10 executes LBT with respect to each of LBT pilot resources of a primary CC of the selected LBT group (Step S610).

Then, the base station 10 and the terminal apparatus 20 transmit and receive data to and from each other using a CC corresponding to the LBT pilot resource determined to be in the idle state (Step S612). In addition, the base station 10 or the terminal apparatus 20 (specifically, a data transmission source) transmits an LBT pilot signal using the LBT pilot resource corresponding to the CC used in the data transmission (Step S614).

Thereby, the process ends.

6. Application Examples

The technology according to the present disclosure is applicable to various products. The base station 10 may also be implemented, for example, as any type of evolved Node B (eNB) such as macro eNBs and small eNBs. Small eNBs may be eNBs that cover smaller cells than the macrocells, such as pica eNBs, micro eNBs, or home (femto) eNBs.

Instead, the base station 10 may be implemented as another type of base station such as Nodes B or base transceiver stations (BTSs). The base station 10 may include the main apparatus (which is also referred to as base station apparatus) that controls wireless communication and one or more remote radio heads (RRHs) that are disposed at different locations from that of the main apparatus. Also, various types of terminals described below may function as the base station 10 by temporarily or semi-permanently executing the functionality of the base station. Furthermore, at least some of structural elements of the base station 10 may be realized in a base station apparatus or a module for a base station apparatus.

Further, the terminal apparatus 20 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 20 may be implemented as a machine type communication (MTC) terminal for establishing a machine to machine (M2M) communication. Furthermore, at least some of structural elements of the terminal apparatus 20 may be implemented as a module (e.g., integrated circuit module including a single die) that is mounted on these terminals.

6.1. Application Examples for Base Station

First Application Example

Figure 19:
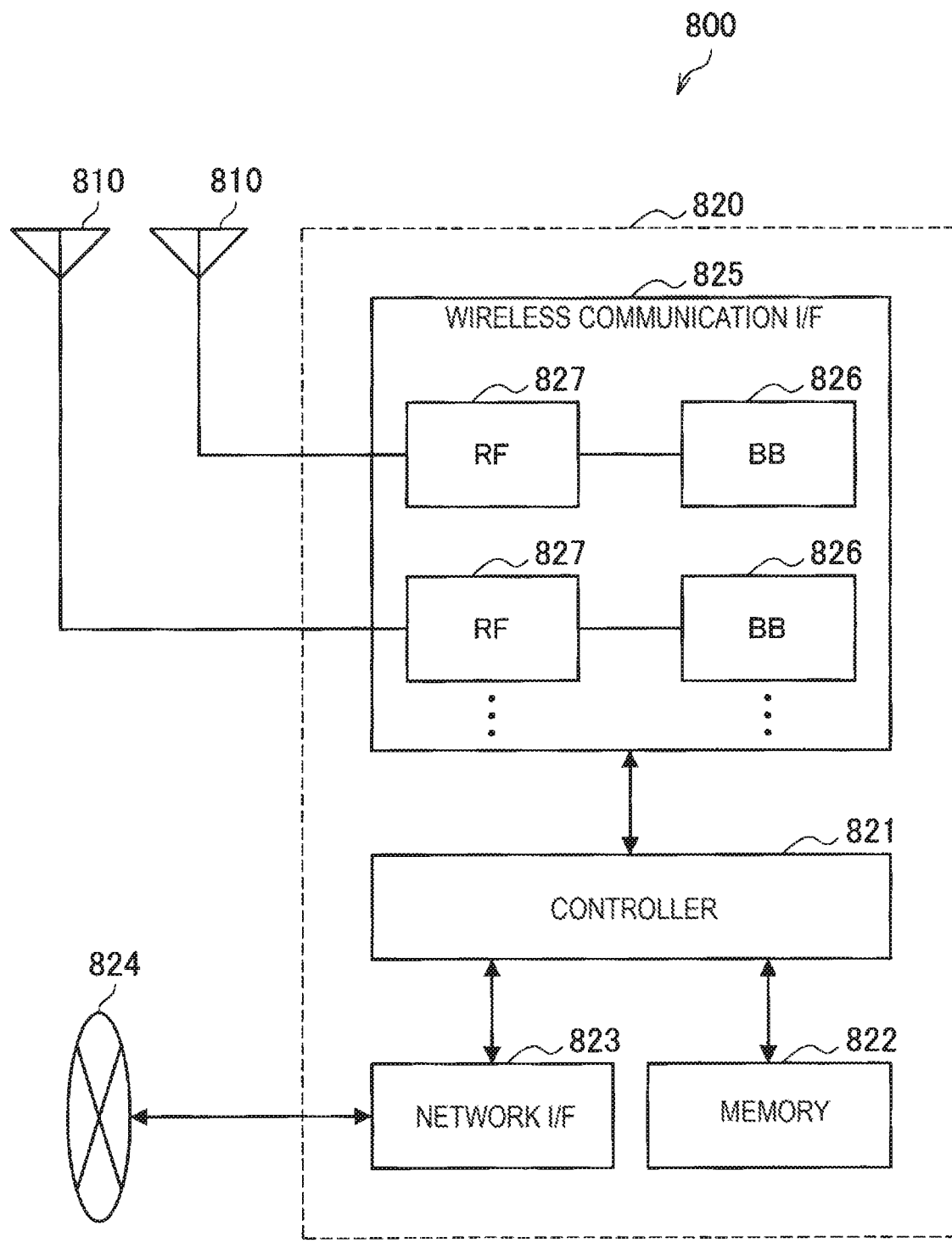
FIG. 19 is a block diagram illustrating a first example of a schematic configuration of an eNB.

FIG. 19 is, a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 19, and the plurality of antennas 810 may, for example, correspond to a plurality of frequency bands used by the eNB 800. It should be noted that while FIG. 19 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e g L1 medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 19, and the plurality of BB processors 826 may, for example, correspond to a plurality of frequency bands used by the eNB 800. Further, the wireless communication interface 825 may also include a plurality of the RF circuits 827, as illustrated in FIG. 19, and the plurality of RF circuits 827 may, for example, correspond to a plurality of antenna elements. Note that FIG. 19 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 19, one or more structural elements included in the processing unit 150 (the communication processing unit 151, the LBT processing unit 153 and/or the setting unit 155) described with reference to FIG. 3 may be implemented by the wireless communication interface 825. Alternatively, at least some of these structural elements may be implemented by the controller 821. As an example, a module which includes a part (e.g., the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one more structural elements) and may execute the program. As another example, the program for causing the processor to function as the one or more structural elements may be installed in the eNB 800, and the wireless communication interface 825 (e.g., the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 19, the wireless communication unit 120 described with reference to FIG. 3 may be implemented by the wireless communication interface 825 (e.g., the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 20:
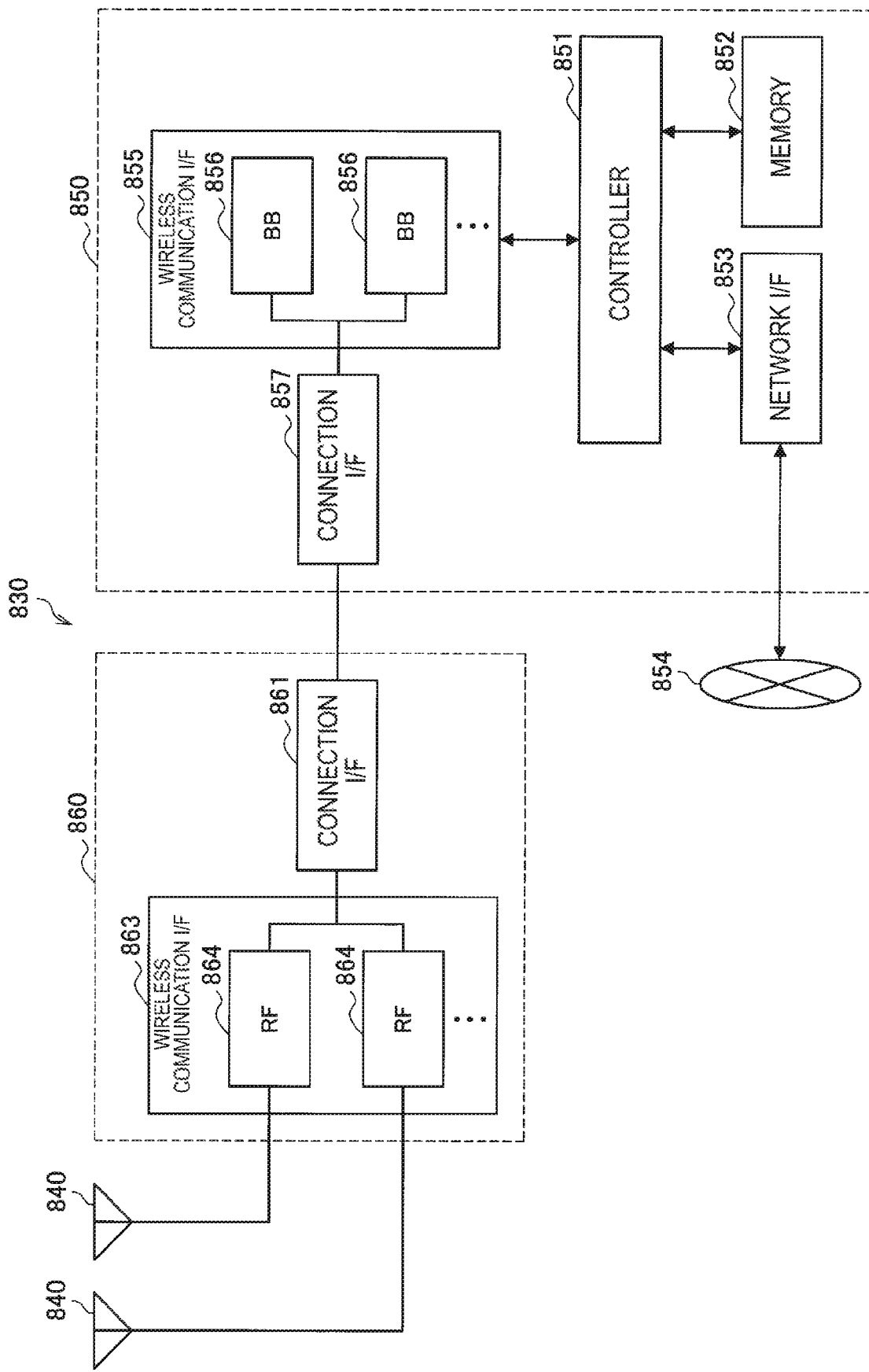
FIG. 20 is a block diagram illustrating a second example of the schematic configuration of the eNB.

FIG. 20 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be, connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 20, and the plurality of antennas 840 may, for example, correspond to a plurality of frequency bands used by the eNB 830. Note that FIG. 20 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 19.

The wireless communication interface 855 supports a cellular communication system such as LTE and LTE-Advanced, and provides wireless connection to a terminal located in a sector corresponding to the RIM 860 via the RRH 860 and the antenna 840. The wireless communication interface 855 may typically include a BB processor 856 or the like. The BB processor 856 is similar to the BB processor 826 described with reference to FIG. 19 except that the BB processor 856 is connected to an RF circuit 864 of the RRH 860 via the connection interface 857. The wireless communication interface 855 may include a plurality of the BB processors 856, as illustrated in FIG. 20, and the plurality of BB processors 856 may, for example, correspond to a plurality of frequency bands used by the eNB 830. Note that FIG. 20 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RPM 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RE circuits 864 as illustrated in FIG. 20, and the plurality of RF circuits 864 may, for example, correspond to a plurality of antenna elements. Note that FIG. 20 illustrates an example in which the wireless communication interface 863 includes the plurality of RF circuits 864, but the wireless communication interface 863 may include the single RE circuit 864.

In the eNB 830 illustrated in FIG. 20, one or more structural elements included in the processing, unit 150 (the communication processing unit 151, the LBT processing unit 153 and/or the setting unit 155) described with reference to FIG. 3 may be implemented by the wireless communication interface 855 and/or the wireless communication interface 863. Alternatively, at least some of these structural elements may be implemented by the controller 851. As an example, a module which includes a part (e.g., the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (e.g., the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 20, for example, the wireless communication unit 120 described with reference to FIG. 3 may be implemented by the wireless communication interface 863 (e.g., the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

6.2. Application Examples for Terminal Apparatus

First Application Example

Figure 21:
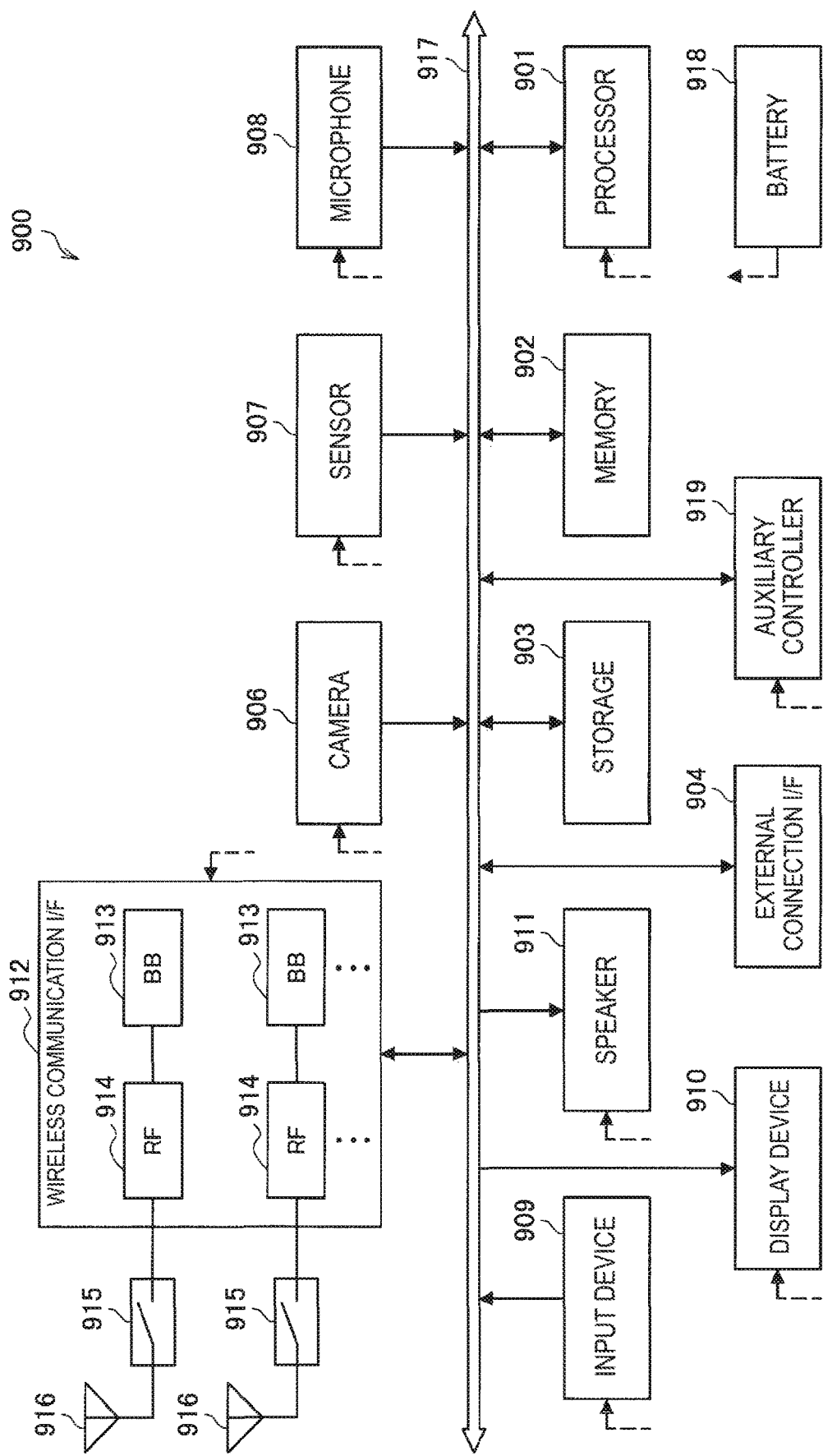
FIG. 21 is a block diagram illustrating an example of a schematic configuration of a smartphone.

FIG. 21 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 21. Note that FIG. 21 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among, a plurality of circuits (e.g., circuits for different wireless communication systems) included in the wireless communication interface 912.

Each of the antennas 916 includes one or more antenna elements (e.g., a plurality of antenna elements constituting a MIMO antenna) and is used for transmission and reception of the wireless signal by the wireless communication interface 912. The smartphone 900 may include a plurality of antennas 916 as illustrated in FIG. 21. Note that FIG. 21 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated m FIG. 21 via a feeder line that is partially illustrated in the figure as a dashed line. The auxiliary controller 919, for example, operates a minimally necessary function of the smartphone 900 in a sleep mode.

In the smartphone 900 illustrated in FIG. 21, one or more structural elements included in the processing unit 240 (the communication processing unit 241, the LBT processing unit 243 and/or the setting unit 245) described with reference to FIG. 4 may be implemented by the wireless communication interface 912. Alternatively, at least some of these structural elements may be implemented by the processor 901 or the auxiliary controller 919. As an example, a module which includes a part (e.g., the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (e.g., the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 21, for example, the wireless communication unit 220 described with reference to FIG. 4 may be implemented by the wireless communication interface 912 (e.g., the RF circuit 914). Moreover, the antenna unit 210 may be implemented by the antenna 916. Further, the storage unit 230 may be implemented by the memory 902.

Second Application Example

Figure 22:
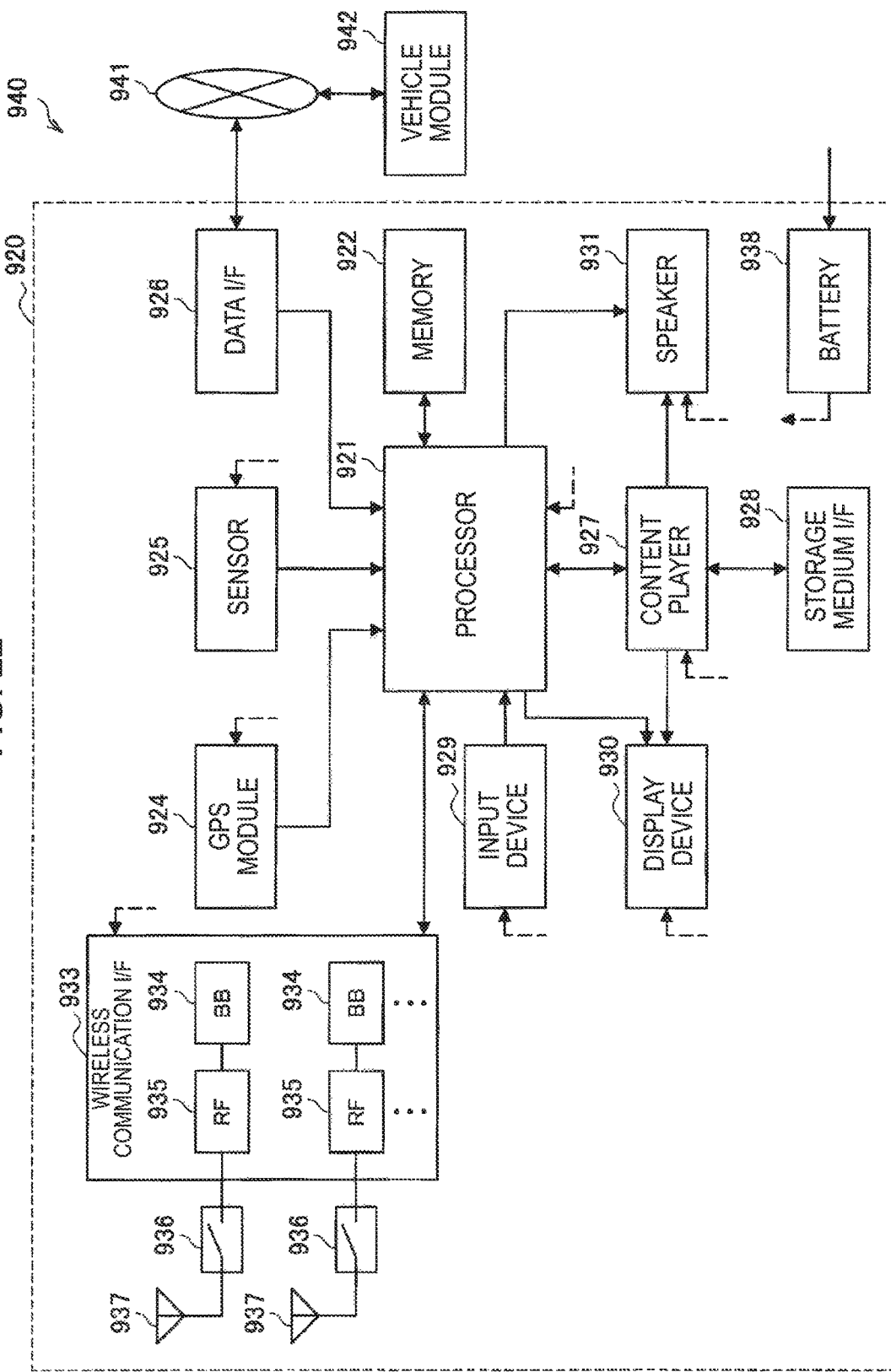
FIG. 22 is a block diagram illustrating an example of a schematic configuration of a car navigation apparatus.

FIG. 22 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930 a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs Wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 22. Note that FIG. 22 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system and in this case, the wireless communication interface 933 may include the BB processor 934 and the RF circuit 935 for each wireless communication system.

Each antenna switch 936 switches a connection destination of the antenna 937 among a plurality of circuits (e.g., circuits for different wireless communication systems) included in the wireless communication interface 933.

Each of the antennas 937 includes one or more antenna elements (e.g., a plurality of antenna elements constituting a MIMO antenna) and is used for transmission and reception of the wireless signal by the wireless communication interface 933. The car navigation apparatus 920 may include a plurality of antennas 937 as illustrated in FIG. 22. Note that FIG. 22 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 22 via a feeder line that is partially illustrated in the figure as a dashed line. Further, the battery 938 accumulates the electric power supplied from the vehicle.

In the car navigation apparatus 920 illustrated in FIG. 22, one or more structural elements included in the processing unit 240 (the communication processing unit 241, the LBT processing unit 243 and/or the setting unit 245) described with reference to FIG. 4 may be implemented by the wireless communication interface 933. Alternatively at least some of these structural elements may be implemented by the processor 921. As an example, a module which includes a part (e.g., the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (e.g., the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 22, for example, the wireless communication unit 220 described with reference to FIG. 4 may be implemented by the wireless communication interface 933 (e.g., the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the communication processing unit 241, the LBT processing unit 243 and the setting unit 245. The vehicle module 942 generates vehicle data such as vehicle speed, engine speed, and trouble information, and outputs the generated data to the in-vehicle network 941.

7. Conclusion

An embodiment of the present disclosure has been described above with reference to FIG. 1 to FIG. 22. As described above, the wireless apparatus (e.g., the base station 10 of the terminal apparatus 20) according to the present embodiment infers, on the basis of a result of LBT related to at least one LBT primary CC included in an LBT group in which a plurality of CCs are included, a result of LBT related to a CC other than the LBT primary CC included in the LBT group. Accordingly, by only executing LBT related to the primary CC, execution of LBT related to the other CC included in the same LBT group can be omitted, and thus efficient LBT is realized. Accordingly, the wireless apparatus can efficiently use CCs of a millimeter-wave band, and efficiency in traffic accommodation of a cellular network can be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the embodiments of the present disclosure can be appropriately combined.

Note that it is not necessary for the processing described in this specification with reference to the flowchart and the sequence diagram to be executed in the order shown in the flowchart and the sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a processing unit configured to infer, on a basis of a result of Listen-Before-Talk (LBT) related to at least one first unit frequency band included in a group that includes a plurality of unit frequency bands, a result of LBT related to a second unit frequency band other than the first unit frequency band included in the group.

(2)

The apparatus according to (1), in which the processing unit acquires information indicating the plurality of unit frequency bands included in the group.

(3)

The apparatus according to (1) or (2), in which the processing unit acquires information indicating the first unit frequency band of the group.

(4)

The apparatus according to any one of (1) to (3), in which the processing unit infers that the result of LBT related to the second unit frequency band is same as the result of LBT of the first unit frequency band.

(5)

The apparatus according to any one of (1) to (4), in which the processing unit determines whether communication using the unit frequency bands is to be performed in units of groups.

(6)

The apparatus according to (5), in which the processing unit communicates with another apparatus using at least the first unit frequency band.

(7)

The apparatus according to (5) or (6), in which the processing unit performs LBT related to the second unit frequency band before performing communication using the second unit frequency band.

(8)

The apparatus according to any one of (1) to (7), in which a number of the unit frequency bands included in the group is arbitrary, and the processing unit selects the group to be subject to LBT on a basis of the number of the unit frequency bands included in the group.

(9)

The apparatus according to (8), in which the number of the unit frequency bands included in the group is a power of 2.

(10)

The apparatus according to any one of (1) to (9), in which the group includes a set of low-ranking groups each including a smaller number of unit frequency bands.

(11)

The apparatus according to (10), in which a first unit frequency band of a high-ranking group coincides with a first unit frequency band of at least one low-ranking group.

(12)

The apparatus according to (11), in which the processing unit preferentially sets the first unit frequency band that coincides with a first unit frequency band of a higher-ranking group as a target of LBT.

(13)

The apparatus according to any one of (1) to (12), in which a signal indicating whether communication using each of the unit frequency bands included in the group is being performed is transmitted on each of resources included in the first unit frequency band, and the processing unit infers that a result of LBT related to each of the resources is a result of LBT related to each of the corresponding unit frequency bands.

(14)

The apparatus according to (13), in which the resources are resources obtained by dividing the first unit frequency band by a time domain.

(15)

The apparatus according to (13) or (14), in which the resources are resources obtained by dividing the first unit frequency band by a frequency domain.

(16)

The apparatus according to any one of (13) to (15), in which the signal transmitted on the resources is transmitted at transmission power according to a radio wave propagation characteristic of the corresponding unit frequency band.

(17)

The apparatus according to any one of (1) to (16), in which the group includes some unit frequency bands among the plurality of unit frequency bands available for a base station.

(18)

The apparatus according to any one of (1) to (17), in which the unit frequency bands are component carriers.

(19)

The apparatus according to any one of (1) to (18), in which the unit frequency bands have a frequency of 6 GHz or higher.

(20)

A method including:

inferring by a processor, on a basis of a result of LBT related to at least one first unit frequency band included in, a group that includes a plurality of unit frequency bands, a result of LBT related to a second unit frequency band other than the first unit frequency band included in the group.

REFERENCE SIGNS LIST 1 system
10 base station
11 small cell
15 core network
16 packet data network
20 terminal apparatus
30 communication control apparatus
31 macro cell
110 antenna unit
120 wireless communication unit
130 network communication unit
140 storage unit
150 processing unit
151 communication processing unit
153 LBT processing unit
155 setting unit
210 antenna unit
220 wireless communication unit
230 storage unit
240 processing unit
241 communication processing unit
243 LBT processing unit
245 setting unit

The invention claimed is:

1. An apparatus, comprising:
processing circuitry configured to
measure a reception power of Listen-Before-Talk (LBT) of a first unit frequency band included in a plurality of unit frequency bands;
determine a first result of the LBT based on the reception power of the LBT of the first unit frequency band, the first result indicating a status of the first unit frequency band; and
determine, in response to the first result indicating that the first unit frequency band is in an idle state or in a busy state, a second result of LBT, the second result indicating a status of a second unit frequency band, wherein
the second unit frequency band is different than the first unit frequency band and is included in the plurality of unit frequency bands,
in a case that the first result indicates that the first unit frequency band is in the idle state, the processing circuitry determines the second result to indicate that the second unit frequency band is in the idle state and transmits signals using the first and second unit frequency bands to a base station, and
in a case that the first result indicates that the first unit frequency band is in the busy state, the processing circuitry determines the second result to indicate that the second unit frequency band is in the busy state and does not transmit signals using the first and second unit frequency bands to the base station.

2. The apparatus according to claim 1, wherein the processing circuitry is further configured to acquire, from the base station, information indicating the plurality of unit frequency bands.

3. The apparatus according to claim 1, wherein the processing circuitry is further configured to acquire, from the base station, information indicating the first unit frequency band of the plurality of unit frequency bands.

4. The apparatus according to claim 1, wherein the processing circuitry is configured to determine that the second result is same as the first result.

5. The apparatus according to claim 1, wherein the processing circuitry is configured to determine whether communication using unit frequency bands is to be performed in units of groups of unit frequency bands.

6. The apparatus according to claim 5, wherein the processing circuitry is configured to perform communication with another apparatus using at least the first unit frequency band.

7. The apparatus according to claim 5, wherein the processing circuitry is configured to perform LBT related to the second unit frequency band before performing communication using the second unit frequency hand.

8. The apparatus according to claim 1, wherein
a number of unit frequency bands included in the plurality of unit frequency bands is arbitrary, and
the processing circuitry is configured to select the plurality of unit frequency bands to be subject to LBT on a basis of a number of unit frequency bands included in the plurality of unit frequency bands.

9. The apparatus according to claim 8, wherein the number of unit frequency bands included in the plurality of unit frequency hands is a power of 2.

10. The apparatus according to claim 1, wherein the plurality of unit frequency bands includes a set of low-ranking groups each including a smaller number of unit frequency bands.

11. The apparatus according to claim 10, Wherein a first unit frequency band of a high-ranking group coincides with a first unit frequency band of at least one low-ranking group.

12. The apparatus according to claim 11, wherein the processing circuitry is configured to preferentially set a first unit frequency band that coincides with a first unit frequency band of a higher-ranking group as a target of LBT.

13. The apparatus according to claim 1, wherein
a signal indicating whether communication using each unit frequency band included in the plurality of unit frequency bands is being performed is transmitted on each of resources included in the first unit frequency band, and
the processing circuitry is configured to determine that a result of LBT related to each of the resources is a result of LBT related to each of corresponding unit frequency bands.

14. The apparatus according to claim 13, wherein the resources are obtained by dividing the first unit frequency band by a time domain.

15. The apparatus according to claim 13, wherein the resources are obtained by dividing the first unit frequency band by a frequency domain.

16. The apparatus according to claim 13, wherein the signal is transmitted at a transmission power according to a radio wave propagation characteristic of a corresponding unit frequency band.

17. The apparatus according to claim 1, wherein the plurality of unit frequency bands includes some unit frequency bands available for a base station.

18. The apparatus according to claim 1, wherein unit frequency bands are component carriers.

19. The apparatus according to claim 1, wherein unit frequency hands have a frequency of 6 GHz or higher.

20. A method, comprising:
   measuring, by processing circuitry of a terminal device, a reception power of Listen-Before-Talk (LBT) of a first unit frequency band included in a plurality of unit frequency bands;
   determining a first result of the LBT based on the reception power of the LBT of the first unit frequency band, the first result indicating a status of the first unit frequency band; and
   determining, by the processing circuitry and in response to the first result indicating that the first unit frequency band is in an idle state or in a busy state, a second result of LBT, the second result indicating a status of a second unit frequency band, wherein
   the second unit frequency band is different than the first unit frequency band and is included in the plurality of unit frequency bands, and
   determining the second result comprises:
      in a case that the first result indicates that the first unit frequency band is in the idle state, determining the second result to indicate that the second unit frequency band is in the idle state and transmitting signals using the first and second unit frequency bands to a base station, and
      in a case that the first result indicates that the first unit frequency band is in the busy state, determining the second result to indicate that the second unit frequency band is in the busy state and not transmitting signals using the first and second unit frequency bands to the base station.

* * * * *